United States Patent [19]

Taylor et al.

[11] Patent Number: 5,520,734
[45] Date of Patent: May 28, 1996

[54] HIGH PRESSURE WATER JET CLEANER AND COATING APPLICATOR

[75] Inventors: Sidney A. Taylor, Houston; Stanley J. Rogala, Katy; Andrzej Stenzel, Houston, all of Tex.

[73] Assignee: CRC-Evans Rehabilitation Systems, Inc., Houston, Tex.

[21] Appl. No.: 289,179

[22] Filed: Aug. 11, 1994

Related U.S. Application Data

[63] Continuation of Ser. No. 188,648, Jan. 28, 1994, abandoned, which is a continuation of Ser. No. 911,759, Jul. 10, 1992, abandoned, which is a continuation-in-part of Ser. No. 567,238, Aug. 14, 1990, Pat. No. 5,129,355, which is a continuation-in-part of Ser. No. 381,103, Jul. 17, 1989, Pat. No. 4,953,496.

[51] Int. Cl.$^6$ .............................. B05B 13/02; F16L 45/00
[52] U.S. Cl. ...................... 118/307; 15/104.04; 118/323; 118/DIG. 11; 134/180
[58] Field of Search ........................... 15/104.04; 118/72, 118/300, 307, 323, DIG. 11; 134/172, 174, 175, 177, 180, 181; 51/429

[56] References Cited

U.S. PATENT DOCUMENTS

| 1,375,979 | 4/1921 | Taber | 118/307 |
| 1,611,920 | 12/1926 | Kinzbach | 15/104.04 |
| 1,796,691 | 3/1931 | Janzen | 118/307 |

(List continued on next page.)

FOREIGN PATENT DOCUMENTS

| 988403 | 5/1976 | Canada . | |
| 1043056 | 11/1978 | Canada . | |
| 1080918 | 7/1980 | Canada . | |
| 1131418 | 9/1982 | Canada . | |
| 1211352 | 9/1986 | Canada . | |
| 2072615 | 7/1991 | Canada | 15/104.04 |

(List continued on next page.)

OTHER PUBLICATIONS

The Soviet Inventions Illustrated, Sep. 25, 1985, p. 5.
The Soviet Inventions Illustrated, Jul. 6, 1988, p. 12.
Soviet Patent Abstracts, Nov. 9, 1988, p. 4.
M. Hashish, "Cutting With Abrasive Waterjets", *Mechanical Engineering*, pp. 60–69, Mar. 1984.
Canadian Ultra Pressure Services Inc. Bulletin, one page, published Nov. 1987.
Canadian Ultra Pressure Services Inc. Brochure, 28 pages, published Dec. 1987.
NLB Corp. Brochure, pp. 8, 9, and 13, Undated.
ADMAC Brochure, "Model 5035 Jetlance™ MKII System", 4 pages, Undated.
ADMAC Brochure drawing, single page, Undated.
Butterworth Jetting Systems Inc. Brochure, "20,000 PSI Waterjetting", 4 pages, published Sep. 1986.
CRC Crose International Inc. Brochure, "Pipe Cleaning/Priming Machines", 4 pages, Undated.
Garneau Pipeline Equipment Corp. Ltd. Brochure, "The Garneau FM 60", 11 pages, Undated.
Instromet Tartarin International Brochure, ">>PCR<< Pipe Coating Remover", 4 pages, Undated.
European Search Report for Application Serial No. 93250149.7.
Soviet Inventions Illustrated, P, Q Sections, Week 8533, Sep. 25, 1985, Derwent Publications Ltd., London, SU–1136–859 (Natural Gas Resins), Undated.
Soviet Patents Abstracts, P,Q Section, Week 8839, Nov. 9, 1988, Derwent Publications, SU–1380–810 (Mentyukov).

*Primary Examiner*—Joseph W. Drodge
*Attorney, Agent, or Firm*—Richards, Medlock & Andrews

[57] ABSTRACT

A pipeline treating apparatus (350) is disclosed which includes a main frame (352) and a pair of wings (354, 356) pivotally mounted to the main frame for surrounding a pipeline to be treated. Each wing mounts at least one bracket (390, 392) for oscillating motion about a portion of the exterior of the pipeline surface. Each bracket mounts at least one nozzle (382) for treating the outer surface of the pipeline. A single drive motor on each wing can drive a pair of brackets, each bracket being oscillated a different arcuate length than the other bracket, if desired. The number of nozzles mounted on each bracket can be varied to address a specific treatment problem.

11 Claims, 27 Drawing Sheets

U.S. PATENT DOCUMENTS

| | | | |
|---|---|---|---|
| 1,815,573 | 7/1931 | McManis | 15/104.04 |
| 1,821,352 | 9/1931 | McManis | 118/307 |
| 1,829,831 | 11/1931 | Hiskey | 118/DIG. 11 |
| 1,899,379 | 2/1933 | Adams | 15/104.04 |
| 1,910,497 | 5/1933 | Peik | 51/429 |
| 1,926,387 | 9/1933 | Jansen | 118/DIG. 11 |
| 2,044,778 | 6/1936 | Halstead | 118/307 |
| 2,053,307 | 9/1936 | Wilson | 118/307 |
| 2,302,196 | 11/1942 | Downs et al. | 118/307 |
| 2,460,989 | 2/1949 | Kraner | 15/104.04 |
| 2,556,116 | 6/1951 | Smith | 144/208 |
| 2,576,861 | 11/1951 | Shaw et al. | 15/210 |
| 2,597,021 | 5/1952 | Norris | 118/324 |
| 2,600,358 | 6/1952 | Bolton et al. | 427/421 |
| 2,611,146 | 9/1952 | Buckley | 15/210 |
| 2,621,446 | 12/1952 | Russell | 51/14 |
| 2,651,312 | 9/1953 | McBeth | 134/122 |
| 2,685,293 | 8/1954 | Dauphinee et al. | 134/199 |
| 2,741,878 | 4/1956 | Morain | 15/104.04 |
| 2,782,436 | 2/1957 | Tomer | 15/104.04 |
| 2,790,230 | 4/1957 | Sobek | 29/81 |
| 2,858,555 | 11/1958 | Medovick | 15/88 |
| 2,869,291 | 1/1959 | Clay | 51/14 |
| 2,896,644 | 7/1959 | Emanuel | 134/99 |
| 2,900,992 | 8/1959 | Johnson | 134/122 |
| 2,933,802 | 4/1960 | Fuchs | 29/90 |
| 2,990,653 | 7/1961 | Browning | 51/8 |
| 3,023,756 | 3/1962 | Proctor | 134/57 |
| 3,033,125 | 5/1962 | Pleuger | 103/220 |
| 3,033,215 | 5/1962 | Miller | 134/98 |
| 3,050,759 | 8/1962 | Betzel, Sr. | 15/104.04 |
| 3,086,537 | 4/1963 | Sieger | 134/61 |
| 3,101,730 | 8/1963 | Harris et al. | 134/167 |
| 3,117,401 | 1/1964 | Talley | 51/241 |
| 3,135,272 | 6/1964 | Brollo | 134/57 |
| 3,225,777 | 12/1965 | Shelton et al. | 134/141 |
| 3,226,277 | 12/1965 | Masuda et al. | 156/345 |
| 3,228,146 | 1/1966 | Rosengarten, Jr. | 118/307 |
| 3,289,238 | 12/1966 | Sorenson et al. | 15/306 |
| 3,306,310 | 2/1967 | Grant | 134/122 |
| 3,324,867 | 6/1967 | Freese | 134/99 |
| 3,362,109 | 1/1968 | Wallace | 51/9 |
| 3,391,701 | 7/1968 | Richardson et al. | 134/123 |
| 3,407,099 | 10/1968 | Schell | 148/153 |
| 3,432,872 | 3/1969 | Kirschke | 15/104.12 |
| 3,439,649 | 4/1969 | Probst et al. | 118/634 |
| 3,468,362 | 9/1969 | Burkhardt et al. | 164/89 |
| 3,689,311 | 9/1972 | Loeffler et al. | 118/72 |
| 3,698,029 | 10/1972 | Pulliam | 15/88.3 |
| 3,760,824 | 9/1973 | Edwards et al. | 134/144 |
| 3,773,059 | 11/1973 | Arneson | 134/123 |
| 3,902,513 | 9/1975 | Franz | 134/151 |
| 3,916,925 | 11/1975 | Crump | 134/172 |
| 3,933,519 | 1/1976 | Koch et al. | 134/34 |
| 3,942,565 | 3/1976 | Ratelle et al. | 144/340 |
| 3,984,254 | 10/1976 | Alexandrov et al. | 134/56 R |
| 3,994,766 | 11/1976 | Dedels | 156/392 |
| 4,005,677 | 2/1977 | Hart | 118/307 |
| 4,007,705 | 2/1977 | Sherer et al. | 118/307 |
| 4,013,518 | 3/1977 | Miko | 202/241 |
| 4,092,357 | 5/1978 | Greco et al. | 260/543 H |
| 4,110,862 | 9/1978 | Buzkinsky et al. | 15/88 |
| 4,125,119 | 11/1978 | Haas | 134/100.1 |
| 4,146,406 | 3/1979 | Sampsell | 134/167 R |
| 4,161,956 | 7/1979 | Hadgkiss | 134/167 C |
| 4,169,427 | 10/1979 | Crump et al. | 118/307 |
| 4,185,359 | 1/1980 | Niccols | 452/106 |
| 4,205,694 | 6/1980 | Thompson et al. | 134/181 |
| 4,219,155 | 8/1980 | Goerss | 239/124 |
| 4,225,362 | 9/1980 | Sentell | 134/24 |
| 4,231,239 | 11/1980 | Lazaroff | 60/205 R |
| 4,237,817 | 12/1980 | Hart et al. | 118/307 |
| 4,237,913 | 12/1980 | Maasberg | 134/167 C |
| 4,244,524 | 1/1981 | Wellings | 239/227 |
| 4,337,784 | 7/1982 | Goerss | 134/34 |
| 4,376,443 | 3/1983 | Mondy, Jr. | 134/168 R |
| 4,443,271 | 4/1984 | Goerss | 134/34 |
| 4,445,451 | 5/1984 | van den Broek | 114/222 |
| 4,460,005 | 7/1984 | Rodger | 134/104.04 |
| 4,509,544 | 4/1985 | Mains, Jr. | 134/144 |
| 4,552,594 | 11/1985 | Van Voskvilen et al. | 134/181 |
| 4,563,841 | 1/1986 | Hart et al. | 51/411 |
| 4,569,159 | 2/1986 | Wern et al. | 51/410 |
| 4,595,607 | 6/1986 | Betteridge et al. | 427/185 |
| 4,603,516 | 8/1986 | Hoffman | 51/425 |
| 4,677,936 | 7/1987 | Dahlem | 118/307 |
| 4,677,998 | 7/1987 | van Voskuilen et al. | 134/181 |
| 4,716,916 | 1/1988 | Hodge | 134/123 |
| 4,718,439 | 1/1988 | Gorra et al. | 134/57 R |
| 4,734,950 | 4/1988 | Schenke et al. | 15/88 |
| 4,771,499 | 9/1988 | Fusi et al. | 15/88 |
| 4,785,588 | 11/1988 | Woodward | 51/429 |
| 4,788,993 | 12/1988 | Beer et al. | 134/123 |
| 4,809,720 | 3/1989 | Heraty | 134/45 |
| 4,811,902 | 3/1989 | Nagata | 239/240 |
| 4,830,882 | 5/1989 | Ichinose et al. | 427/421 |
| 4,872,294 | 10/1989 | Watts | 51/420 |
| 4,931,322 | 6/1990 | Yamamoto et al. | 427/421 |
| 4,951,600 | 8/1990 | Soshi et al. | 118/696 |
| 4,953,496 | 9/1990 | Taylor et al. | 118/DIG. 11 |
| 4,989,785 | 2/1991 | Walendowski | 239/227 |
| 5,001,801 | 3/1991 | Jarvis et al. | 15/93.1 |
| 5,052,423 | 10/1991 | Chapman et al. | 134/174 |
| 5,056,271 | 10/1991 | Rose | 51/319 |
| 5,069,234 | 12/1991 | Nielsen | 15/104.04 |
| 5,074,323 | 10/1991 | Chapman et al. | 134/181 |
| 5,085,016 | 2/1992 | Rose | 15/104.04 |
| 5,091,034 | 2/1992 | Hubert | 156/344 |
| 5,092,357 | 3/1992 | Chapman et al. | 134/181 |
| 5,107,633 | 4/1992 | Rose | 51/429 |
| 5,129,355 | 7/1992 | Taylor et al. | 118/315 |
| 5,136,969 | 8/1992 | Chapman | 15/104.04 |
| 5,191,740 | 3/1993 | Rose | 51/429 |
| 5,199,226 | 4/1993 | Rose | 118/DIG. 11 |
| 5,207,833 | 5/1993 | Hart | 118/307 |
| 5,209,245 | 5/1993 | Chapman et al. | 134/122 R |
| 5,226,973 | 7/1993 | Chapman et al. | 134/34 |

FOREIGN PATENT DOCUMENTS

| | | | |
|---|---|---|---|
| 0000808 | 7/1978 | European Pat. Off. . | |
| 0105545 | 4/1984 | European Pat. Off. . | |
| 0214841 | 3/1987 | European Pat. Off. . | |
| 0343878 | 11/1989 | European Pat. Off. | 15/104.04 |
| 0408883 | 1/1991 | European Pat. Off. | 118/307 |
| 0478922 | 4/1992 | European Pat. Off. | 118/307 |
| 52-19474 | 2/1977 | Japan | 108/307 |
| 54-50158 | 4/1979 | Japan | 134/123 |
| 59-232770 | 12/1984 | Japan . | |
| 60-121286 | 6/1985 | Japan | 15/104.04 |
| 8203501 | 9/1982 | Netherlands . | |
| 447499 | 11/1967 | Switzerland | 108/307 |
| 1276379 | 12/1984 | U.S.S.R. | 15/104.04 |
| 1136859 | 1/1985 | U.S.S.R. . | |
| 1516903 | 7/1978 | United Kingdom . | |
| 2018626 | 10/1979 | United Kingdom . | |
| 8502211 | 5/1985 | WIPO | 134/123 |
| 9111293 | 8/1991 | WIPO | 15/104.04 |

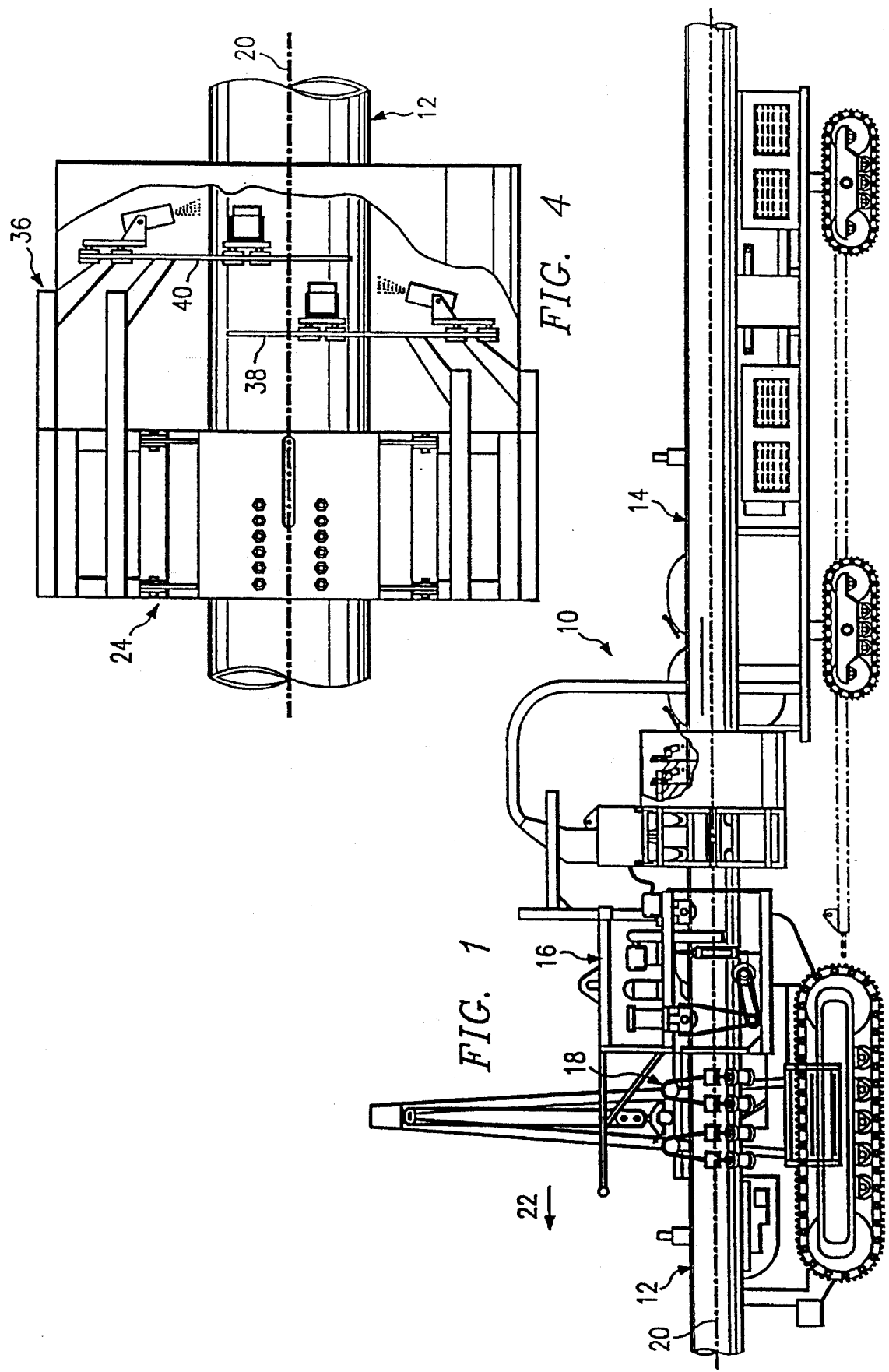

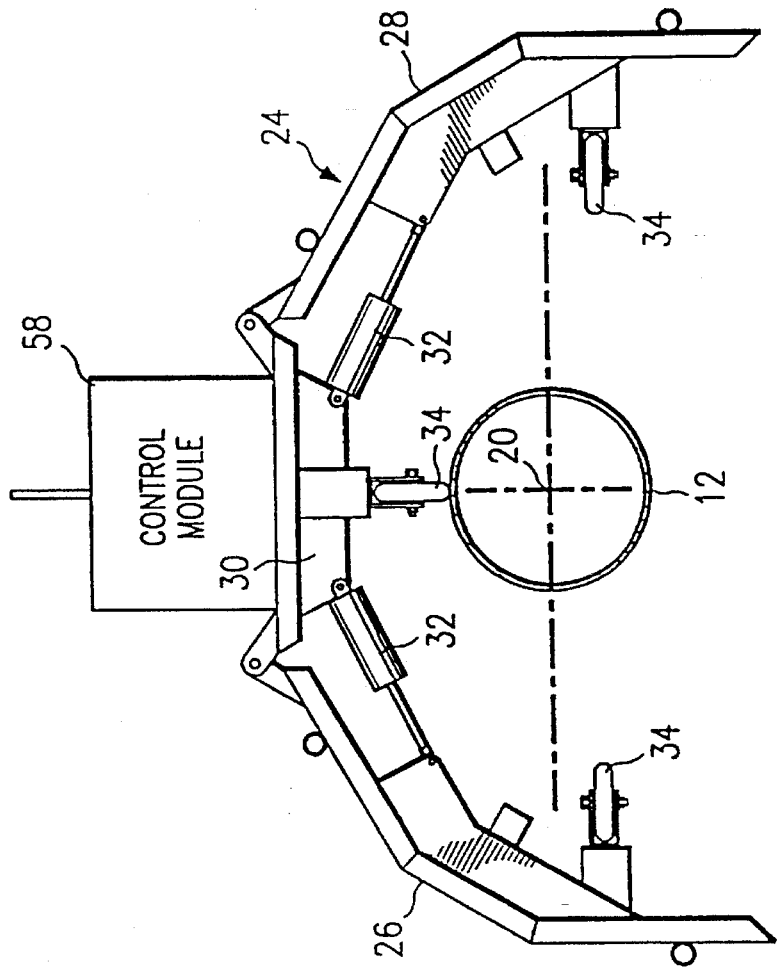
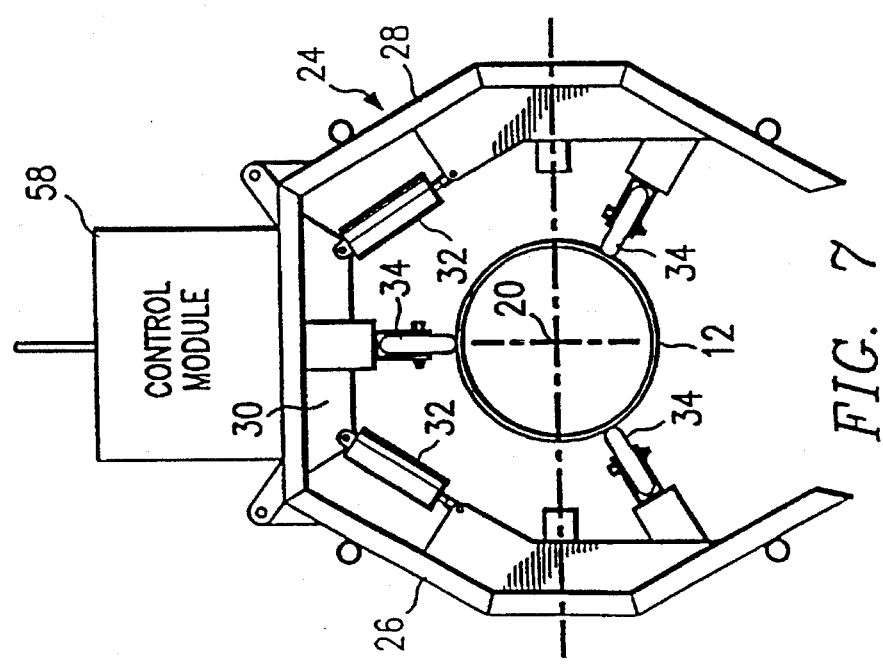
FIG. 8
FIG. 7

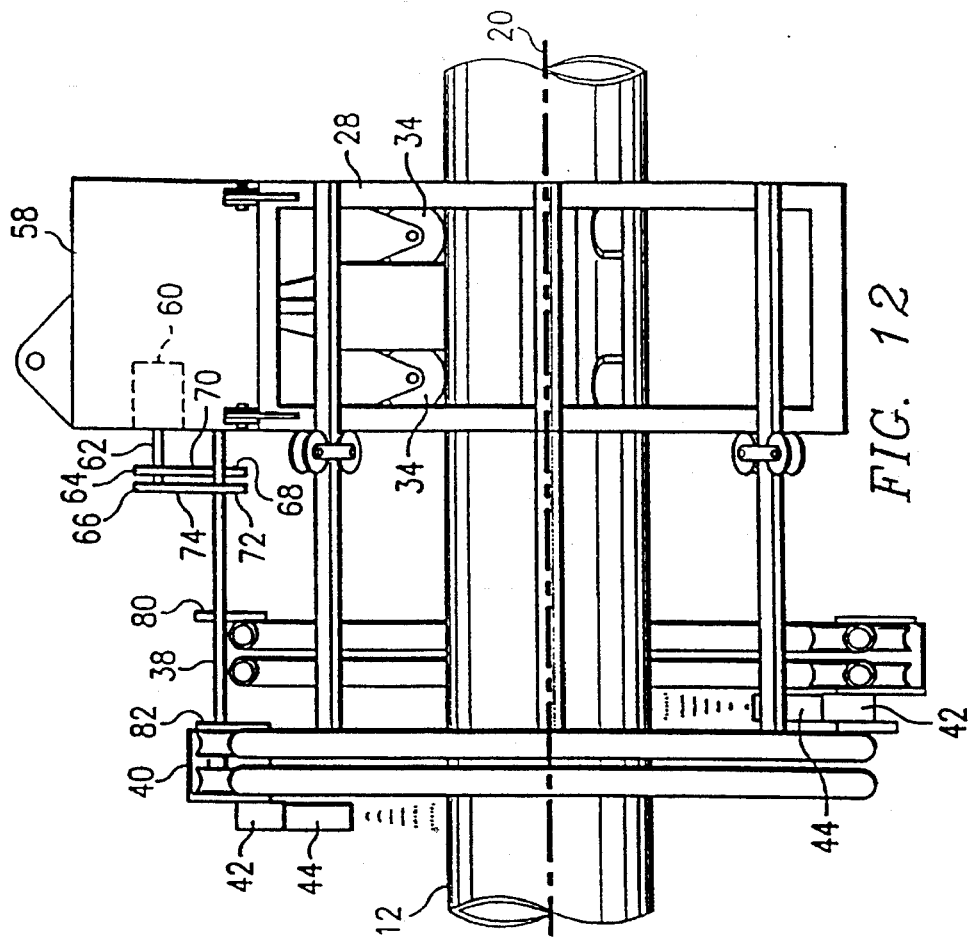
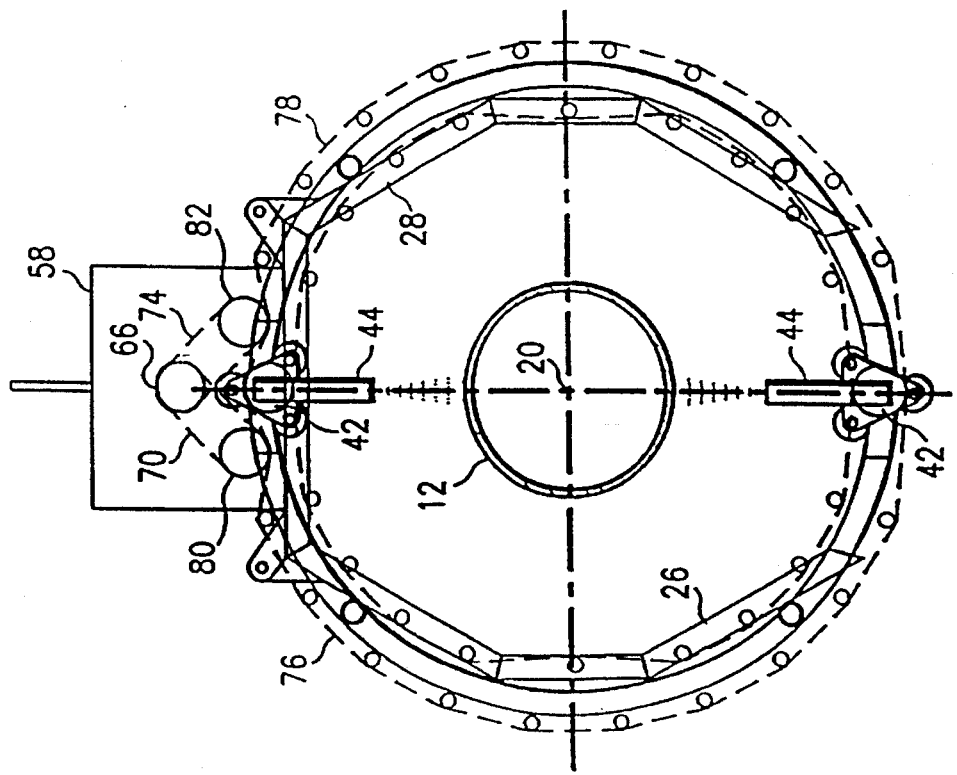
FIG. 12
FIG. 11

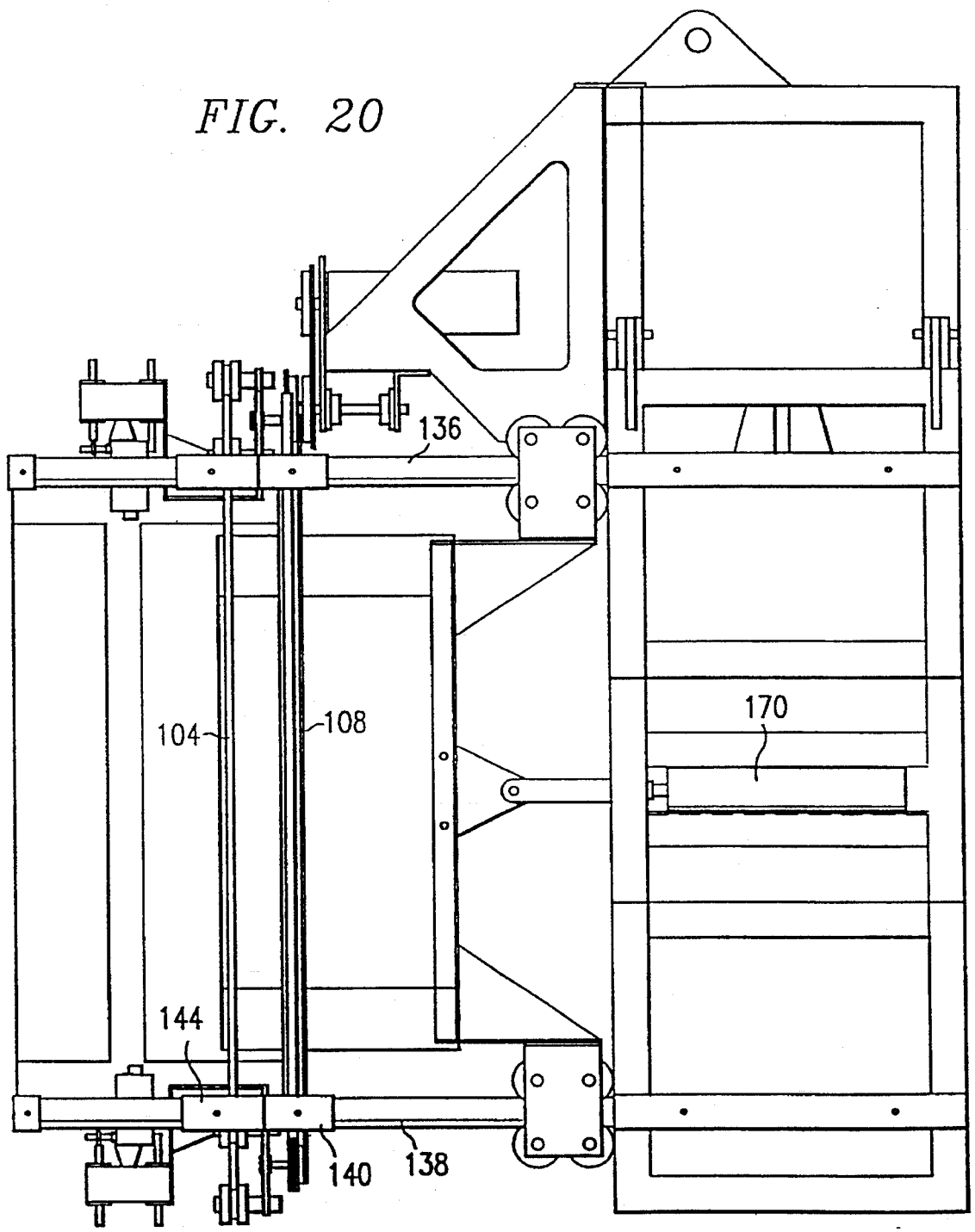

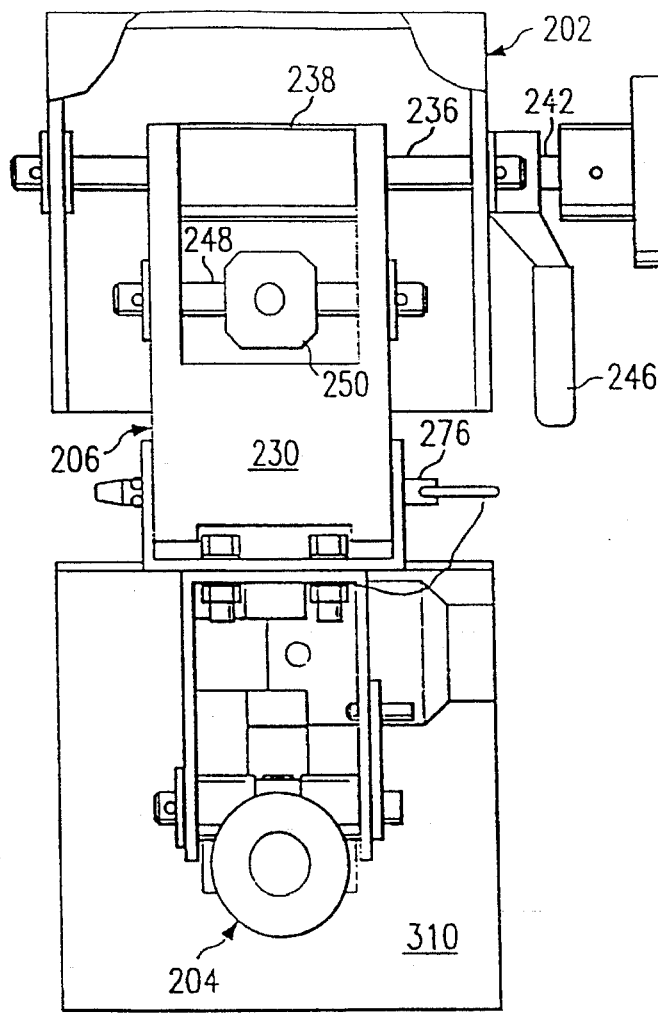
FIG. 31
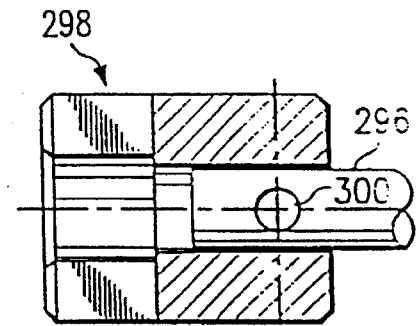
FIG. 37
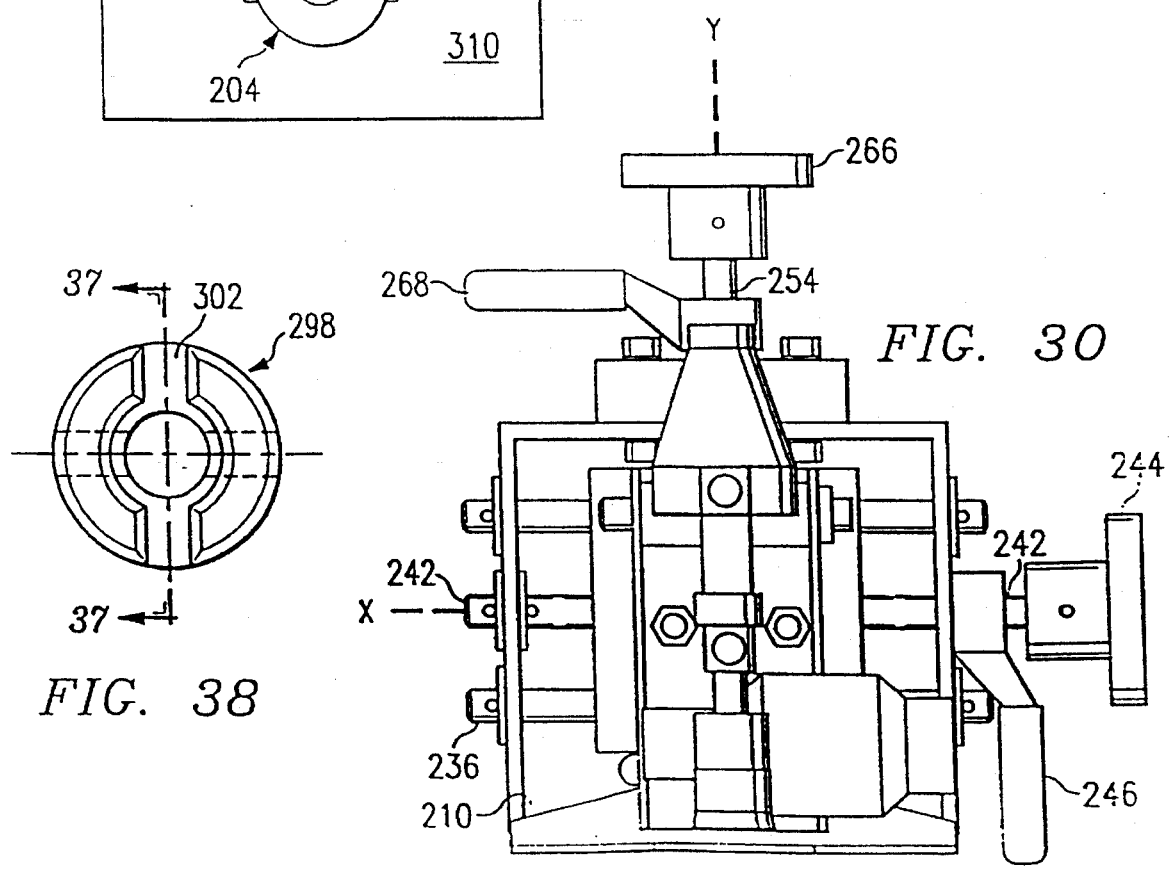
FIG. 38
FIG. 30

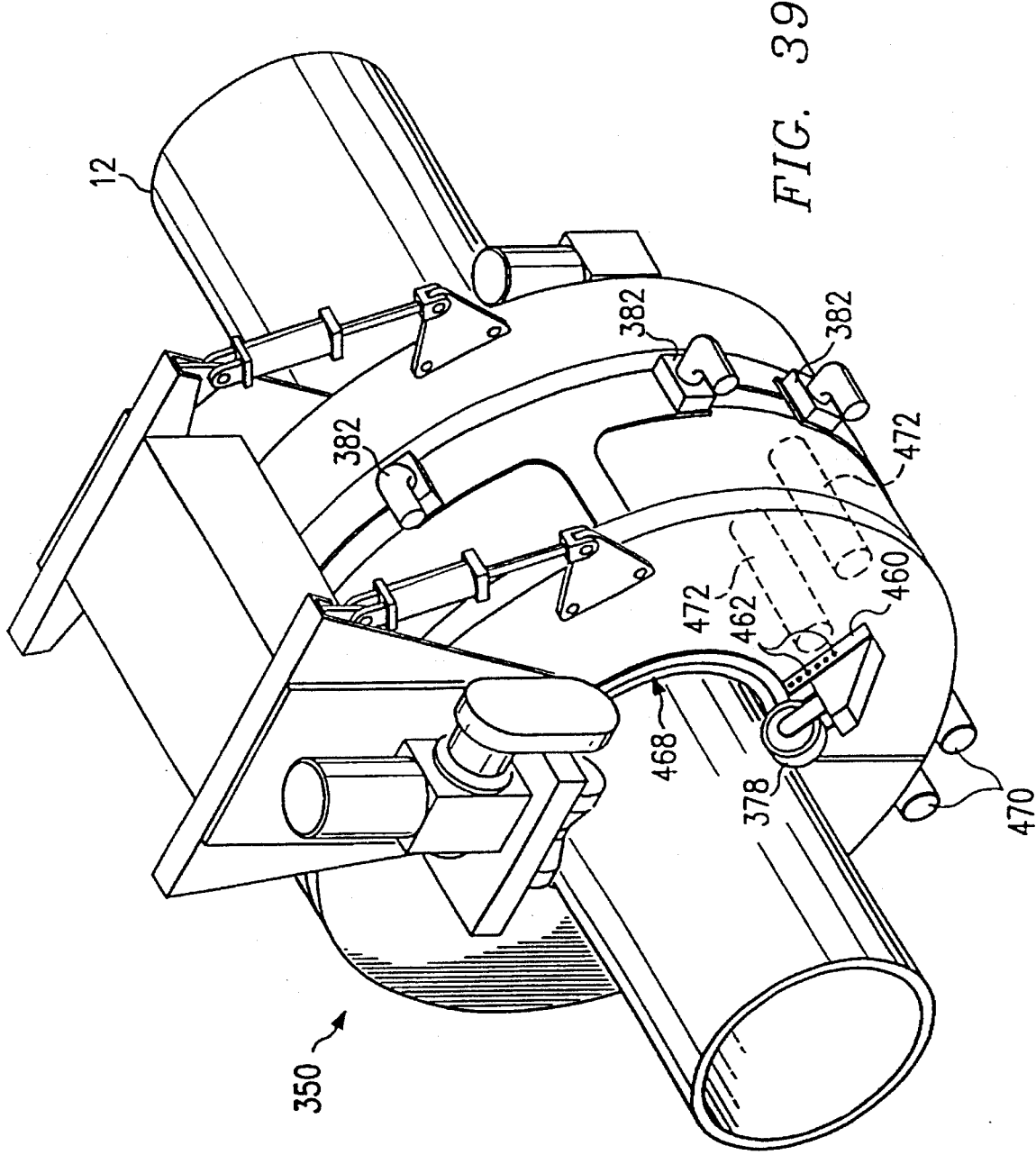

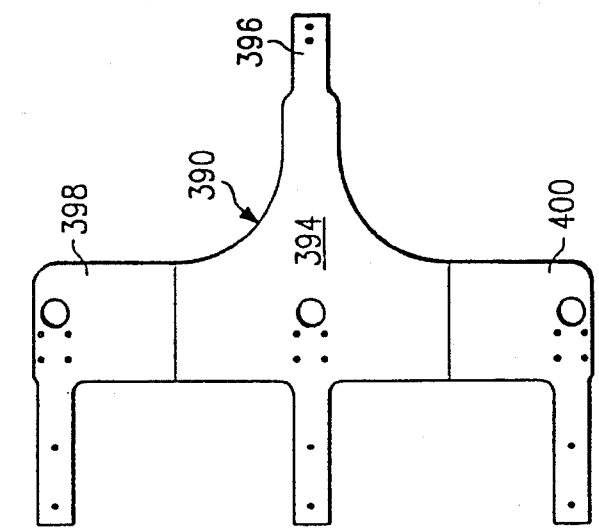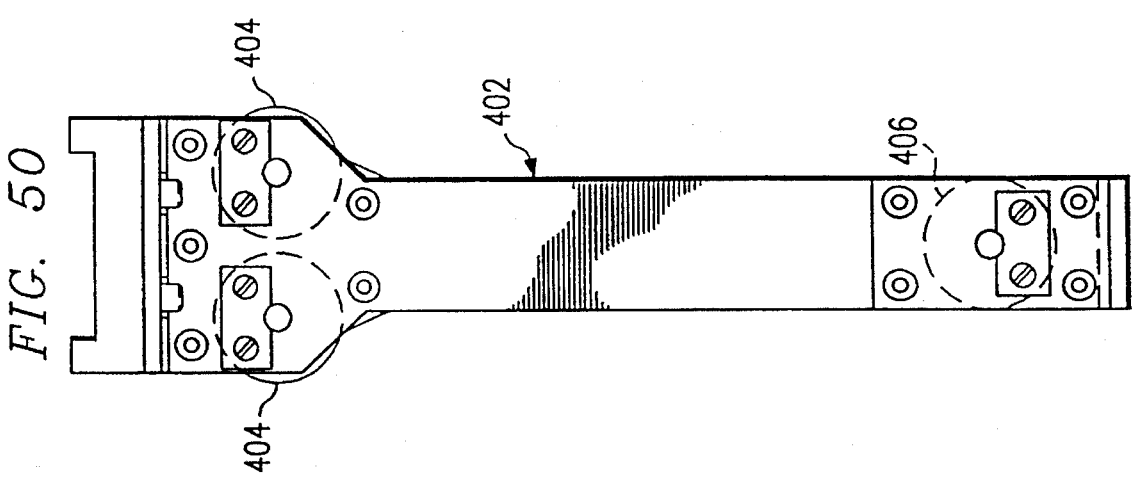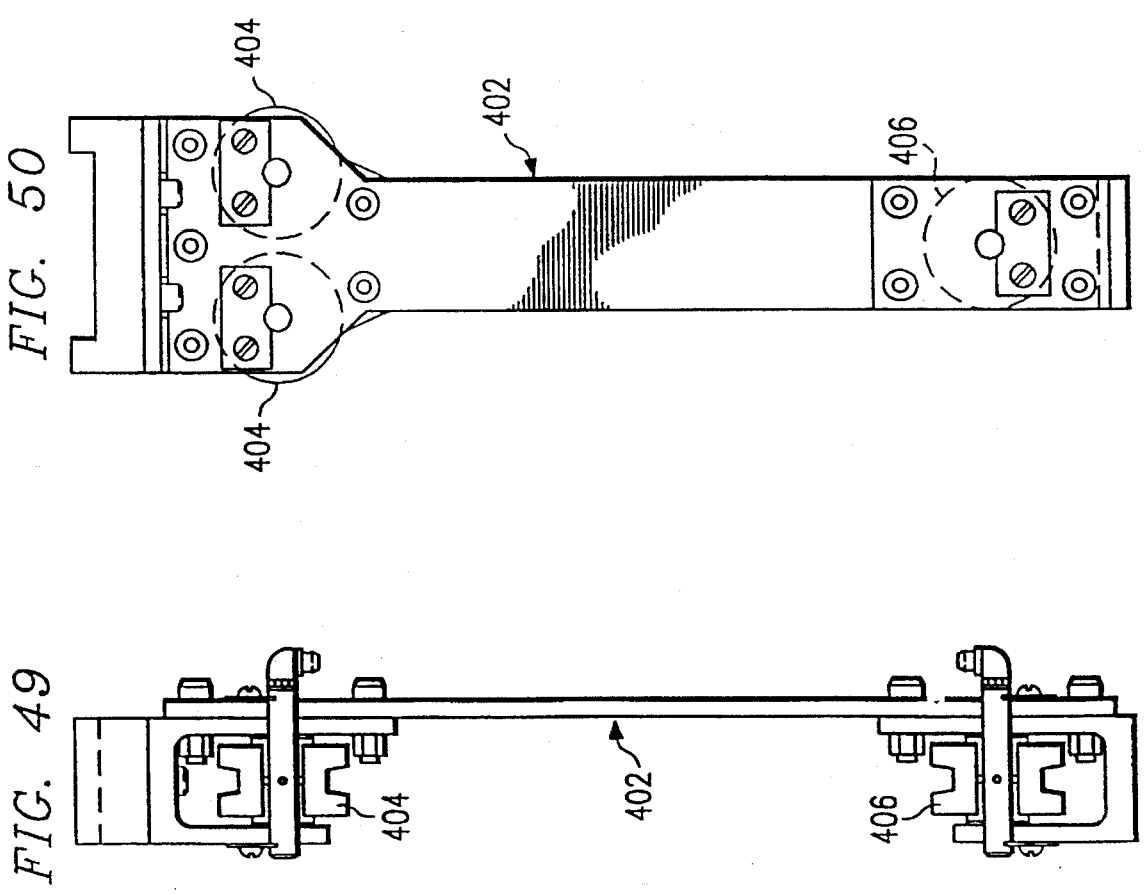

HIGH PRESSURE WATER JET CLEANER AND COATING APPLICATOR

CROSS REFERENCE TO RELATED APPLICATION

This application is a continuation of application Ser. No. 08/188,648 filed Jan. 28, 1994, now abandoned, which is a continuation of application Ser. No. 07/911,759 filed Jul. 10, 1992, now abandoned, which is a continuation-in-part application of Ser. No. 07/567,238 filed Aug. 14, 1990, now U.S. Pat. No. 5,129,355, which is a continuation-in-part application of Ser. No. 07/381,103 filed Jul. 17, 1989, now U.S. Pat. No. 4,953,496.

TECHNICAL FIELD OF THE INVENTION

This invention relates to a device for treating the exterior surface of pipe in a pipeline, including cleaning, surface preparation and coating.

BACKGROUND OF THE INVENTION

A pipeline typically has an outer coating to protect the pipeline from corrosion and other detrimental effects, particularly when the pipeline is buried underground. This coating degrades with time, and, if the pipeline itself is to be prevented from sustaining further permanent damage, the pipeline must be dug up, the old coating removed, the surface of the pipe conditioned and a new coat of protective material applied to the pipeline.

When initially building a pipeline, the individual pipe sections are typically coated prior to shipment the final location, where they are welded the pipeline. By coating the pipe sections prior shipment, it is possible that the coating will be damaged in shipment. Also, the welding of the pipe sections together destroys the coating at the welded ends. Coating damage due to shipment and welding must be repaired on a spot basis as the pipeline is constructed. Because of the excellent corrosion protection, impact and adhesive properties, it would be advantageous to coat the entire pipeline with a plural component polyurethane material the construction site. However, no technique has been developed to date to do so economically and production rates required.

In a typical pipeline rehabilitation operation, the pipeline will be uncovered, and a lifting mechanism, such as a crane, will be used to lift the exposed portion the pipeline out of the ditch and rest the exposed pipeline on skids to provide access to the entire outer surface of the pipeline in the portion between the skids. The pipe must then be cleaned, the outer surface pipeline prepared to receive a new protective coat, and the pipeline then recoated.

Initially, manual labor was required to remove the old coating with hand tools such as scrapers. This technique is obviously time consuming and quite expensive. Various attempts have been made to provide more automation to the cleaning procedure, including U.S. Pat. No. 4,552,594 issued Nov. 12, 1985 to Van Voskuilen and U.S. Pat. No. 4,677,998 issued Jul. 7, 1987 to the same inventor. These patents disclose the use of high pressure water jets which are moved in a zigzag path along the pipe surface to be cleaned to slough off the coating. While devices of this type have been an improvement over manual cleaning, there still exists a need in the industry for enhanced performance in the cleaning and recoating operation.

SUMMARY OF THE INVENTION

In accordance with one aspect of the present invention, an apparatus is provided for treating a pipeline. The apparatus includes a centering assembly mounted on the pipeline for movement along the pipeline. A nozzle carriage assembly is mounted on the centering assembly and defines at least one arcuate ring mounted thereon. The centering assembly has at least one arm pivotally mounted to the centering assembly, with the arcuate ring mounted on the arm. The arm and ring are pivotal between a first position with the ring concentric to the center axis of the pipeline and a second position spaced from the pipeline to allow the centering assembly and nozzle carriage assembly to be removed from the pipeline. At least one spray nozzle is mounted on the arcuate ring. The spray nozzle can be mounted on the ring for reciprocating arcuate travel for a predetermined arc along the arcuate ring.

In accordance with another aspect of the present invention, the spray nozzle can be used to spray a high pressure water jet to clean the pipeline, a combination of water and entrained abrasive for enhanced cleaning and obtaining an angular surface profile, or for applying a pipe coating.

In accordance with another aspect of the present invention, two arcuate rings are mounted on the nozzle carriage assembly on opposite sides of the pipeline. A plurality of spray nozzles are mounted on each arcuate ring, each reciprocating through a predetermined arc. Preferably, the centering assembly and nozzle carriage assembly are moved along the pipeline at a velocity that is one-half the width of each reciprocation path of the spray nozzle to cover the surface of the pipeline twice as the apparatus moves along the pipeline.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 1 is a side view of an automated pipeline treating apparatus forming a first embodiment of the present invention;

FIG. 4 is a top view of the automated jet cleaning unit of FIG. 2;

FIG. 7 is an end view of the centering assembly used in the apparatus centered about a pipeline;

FIG. 8 is an end view of the centering apparatus in the removal position;

FIG. 11 is an end view of the nozzle carriage assembly and abrasive cleaning nozzles illustrating the chain drive;

FIG. 12 is a side view of the nozzle carriage assembly and abrasive cleaning nozzles;

FIG. 20 is a simplified side view of the apparatus of FIG. 17;

FIG. 30 is an end view of the nozzle assembly;

FIG. 31 is a top view of the nozzle assembly;

FIG. 37 is a side view of the nozzle adapter;

FIG. 38 is an end view of the nozzle adapter;

FIG. 39 is a perspective view of a pipeline treating apparatus forming a third embodiment of the present invention;

FIG. 49 is a side view of a carriage used in the apparatus;

FIG. 50 is a front view of the carriage of FIG. 49;

FIG. 51 is a top view of a bracket used in the apparatus;

FIG. 52 is a side view of a bracket of FIG. 51;

DETAILED DESCRIPTION

Figure 3:
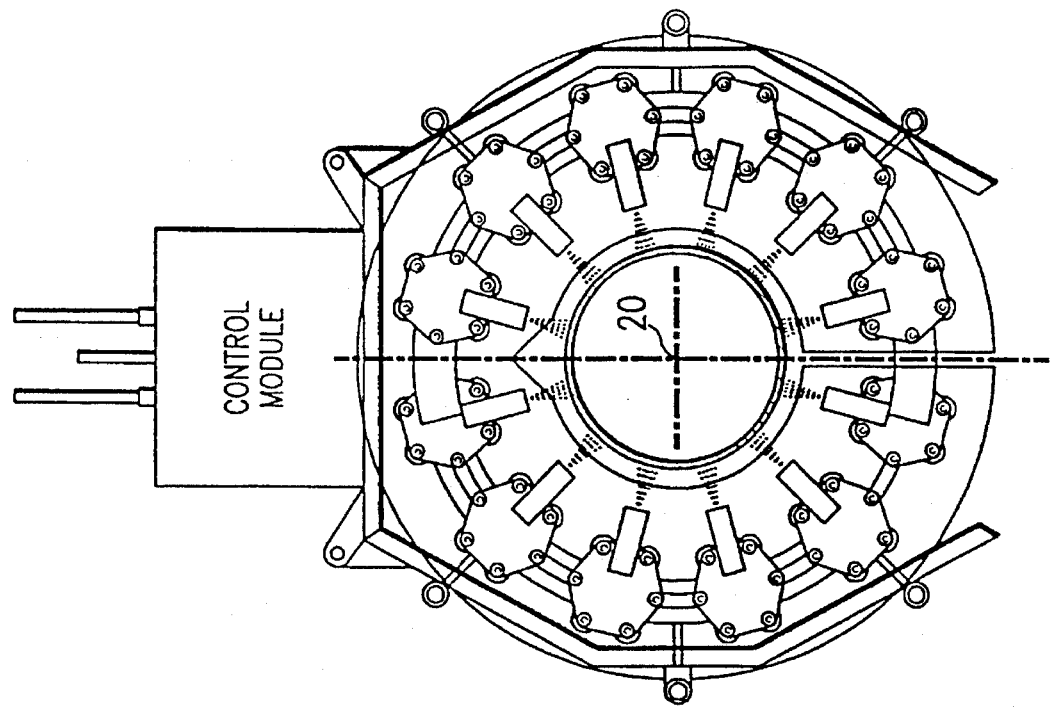
FIG. 3 is a front view of the automated jet cleaning unit of FIG. 2.

With reference now to the accompanying drawings, wherein like reference numerals designate like or similar parts throughout the several views, an automated pipeline treating apparatus 10 forming a first embodiment of the invention is illustrated in FIGS. 1–16. The apparatus 10 is used to clean and/or coat a pipeline 12, which can be either a new pipeline or a previously coated pipeline in need of rehabilitation. Typically, the pipeline to be rehabilitated will be a pipeline which has just been uncovered and raised out of the ditch with the original coating on the pipeline having degraded to a condition that is no longer serviceable.

In various modes of the apparatus 10, the apparatus can be used to clean any old coating off the pipeline and condition the outer surface of the pipeline itself for a new coating. In another mode, the apparatus 10 can be used to spray on the new coating once the pipeline surface has been prepared.

In the cleaning and surface preparation mode, the apparatus 10 includes three major sections, a sled unit 14, a travel unit 16 and an automated jet cleaning unit 18. The sled unit 14 is commonly mounted on tracks which is pulled parallel to the pipeline being treated and the weight of the sled unit thus has no effect whatsoever on the pipeline. In contrast, the travel unit 16 and automated jet cleaning unit 18 are supported on the pipeline itself for movement along the axis 20 of the pipe in the direction of arrow 22. The weight of the travel unit and automated jet cleaning unit will be such as to be readily carried by the pipeline without damage. The weight of these units does not have to be supported by a side boom or other lifting device during operation.

With reference to FIGS. 2–8, various details of the automated jet cleaning unit 18 can be further described. The unit 18 includes a centering assembly 24. As best shown in FIGS. 7 and 8, the centering assembly 24 can be seen to include pivotal arms 26 and 28 which pivot on frame member 30 through the action of hydraulic cylinders 32 between an operating position, shown in FIG. 7, and an installation or removal position, shown in FIG. 8. Each of the arms, and the frame member mount an aligned pair of guide wheels 34 to support the centering assembly 24 on the pipeline. In the operating position, as seen in FIG. 7, the three pairs of guide wheels are distributed at 120° from each other around the pipeline so that the centering assembly 24 is centered on the pipeline. preferably, air pressure is maintained in cylinders 32 when the centering assembly is in the operating position to hold wheels 34 firmly against the pipeline to keep the centering assembly centered on the axis 20 of the pipe despite weld joints and surface irregularities.

Figure 6:
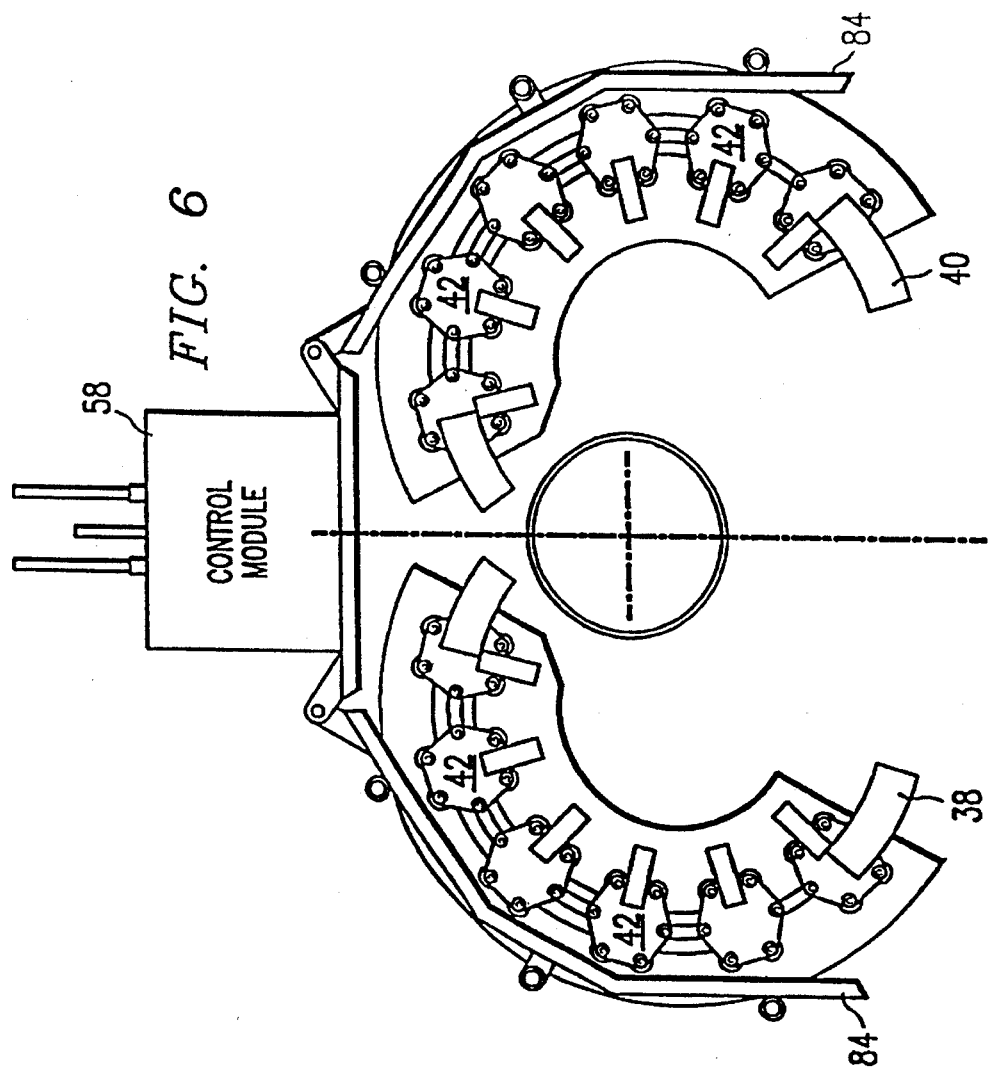
FIG. 6 is an end view of the nozzle carriage assembly and abrasive cleaning nozzles with the arcuate rings on which the nozzles are mounted pivoted to the removal position.
Figure 5:
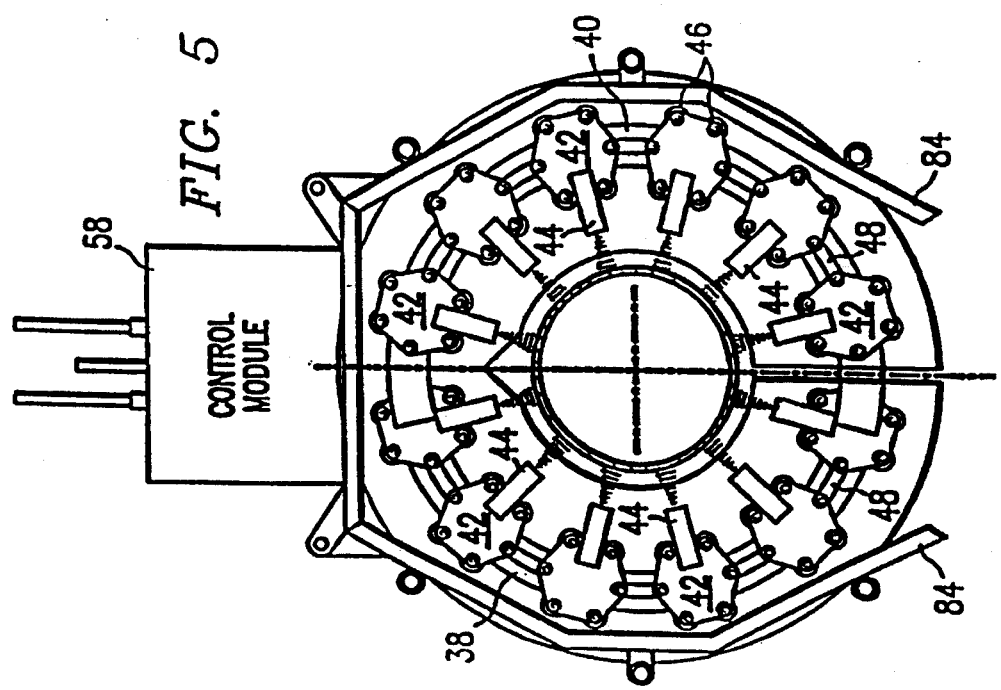
FIG. 5 is an end view of the nozzle carriage assembly and abrasive cleaning nozzles utilized in the apparatus.

Attached to the centering assembly 24 is a nozzle carriage assembly 36. The nozzle carriage assembly 36 includes two arcuate rings 38 and 40. Ring 38 is rigidly secured to arm 26. Ring 40 is similarly rigidly secured to arm 28. Thus, as seen in FIG. 6, as the cylinders 32 operate to pivot arms 26 and 28 into the installation or removal position, the arcuate rings 38 and 40 are similarly deployed.

As best seen in FIG. 4, the rings 38 and 40 are spaced apart a distance L from each other along the pipeline axis 20.

The rings preferably have an arc greater than 180°. The radius of the rings 38 and 40 is selected so that the rings are concentric with the pipeline axis 20 when the arms 26 and 28 are in the operating position. Thus, in the operating position, the rings 38 and 40 are at a constant distance from the outer surface of the pipeline about the entire circumference of the pipeline.

Mounted on the arcuate rings 38 and 40 are a series of abrasive cleaning nozzle carriages 42, with each carriage supporting an abrasive cleaning nozzle 44. There are illustrated six carriages and nozzles on each of the rings 38 and 40. However, this number can be varied as will be described in detail hereinafter.

Each of the carriages 42 is supported on a ring by a series of wheels 46 guided on the inner and outer edges of the ring to permit the carriage and attached nozzle to move in an arcuate manner along the ring. Each of the carriages on a particular ring are interconnected by links 48 pivoted between adjacent carriages. Thus, motion of a carriage will be mirrored by the motion of the rest of the carriages on that particular ring.

Figure 15:
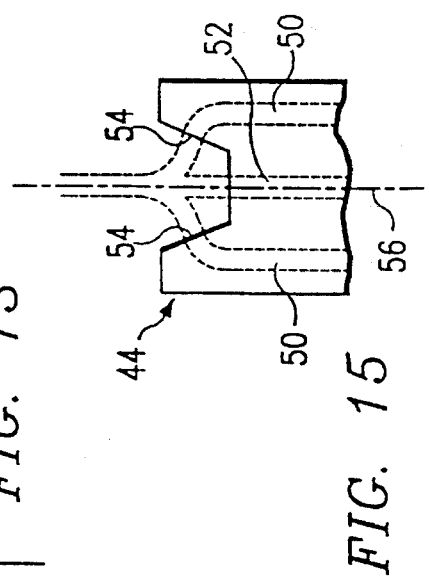
FIG. 15 is an illustrative view of the nozzle used in the apparatus.
Figure 17:
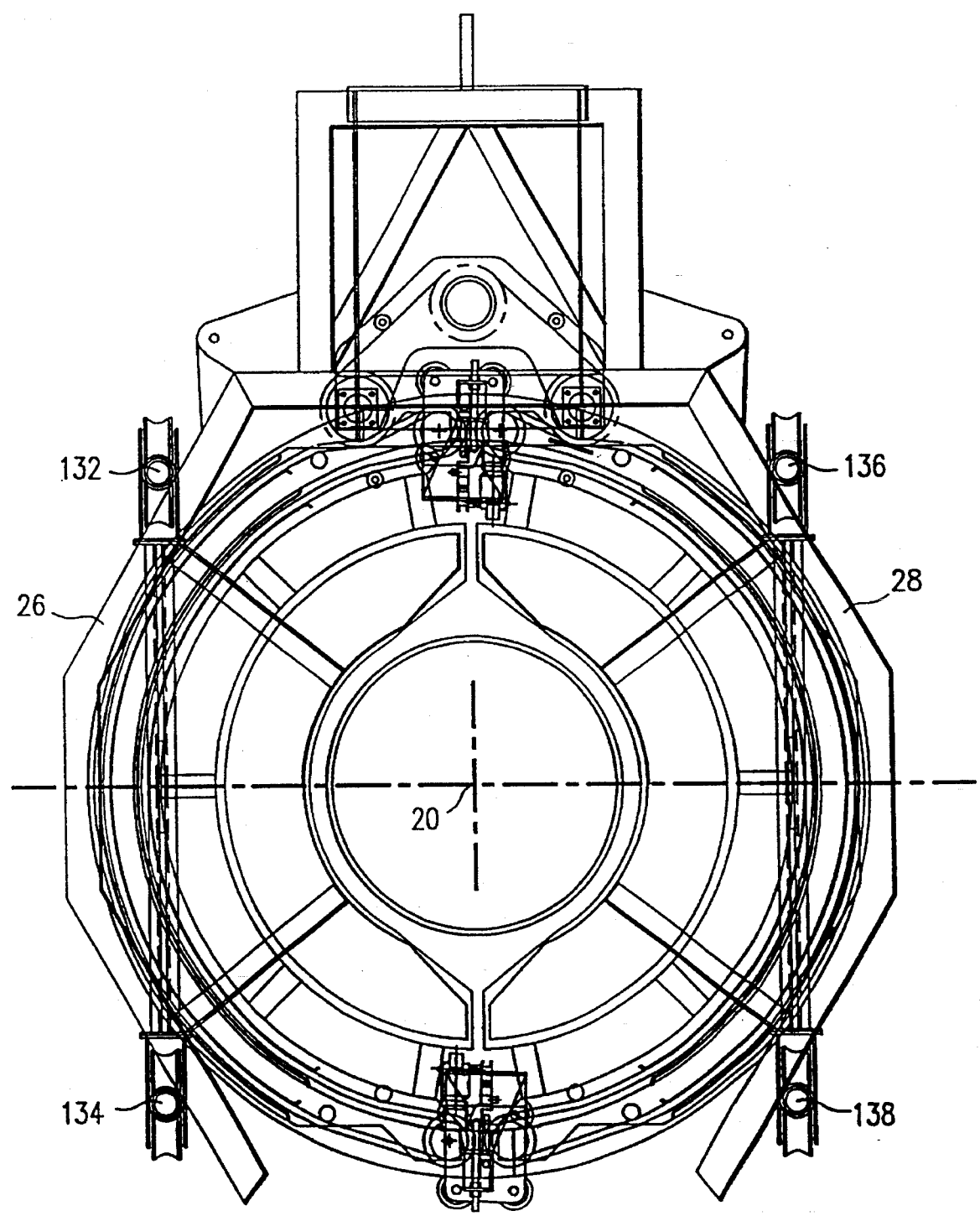
FIG. 17 is an end view of an automated pipeline treating apparatus forming a second embodiment of the present invention.

With reference to FIG. 15, the details of the abrasive cleaning nozzles 44 can be described. The nozzles have passages 50 to carry high pressure water, for example in a pressure range of 10,000–15,000 psi. An abrasive channel 52 carries abrasives (typically sand) which are entrained in the water flow to enhance the cleaning activity of the nozzle. As can be seen, the high pressure water is sprayed from the nozzle through ports 54 at an angle relative to the center axis 56 of the nozzle and toward the axis 56. This creates a relative vacuum at passage 52 to entrain the abrasives in the water jet flow to enhance the cleaning action and provide an additional force to move the abrasive.

Figure 2:
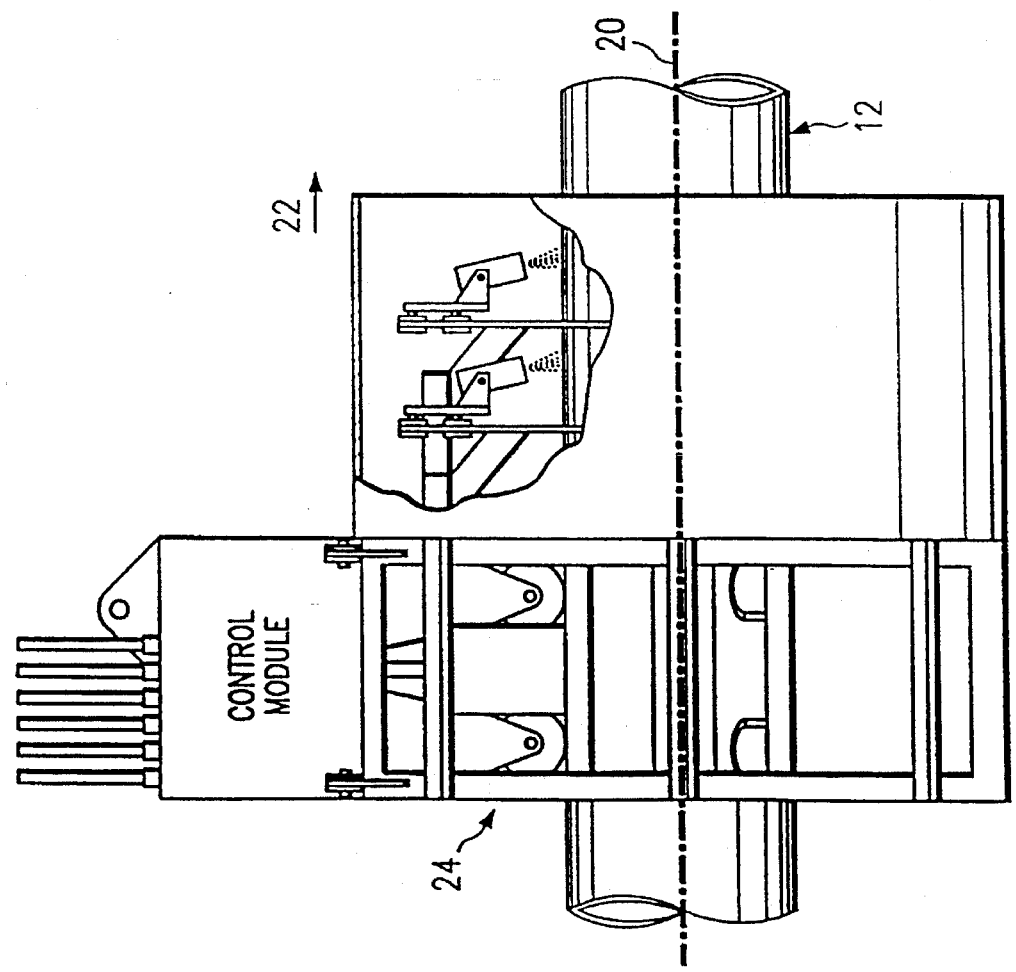
FIG. 2 is a side view of the automated jet cleaning unit used in the apparatus of FIG. 1.

As can be seen in FIG. 2, the abrasive nozzles 44 are preferably mounted on their carriages so that the jet impinges on the outer surface of the pipeline at an oblique angle to the surface. The nozzles are preferably adjustably mounted to allow the operator to select the best angle. It has been found that this enhances the efficiency of cleaning. The use of high pressure water jets, particularly with entrained abrasives, is an improvement over shot blast cleaning, where shot impinges against the outer surface of the pipeline. Shot blast cleaning leaves a relatively smooth outer surface to the pipeline, which is not a suitable surface profile for bonding with adhesive to apply a new coat on the pipeline. The high pressure water jet, particularly with entrained abrasives, generates a highly irregular angular surface which is very conducive for bonding with adhesive.

Figure 10:
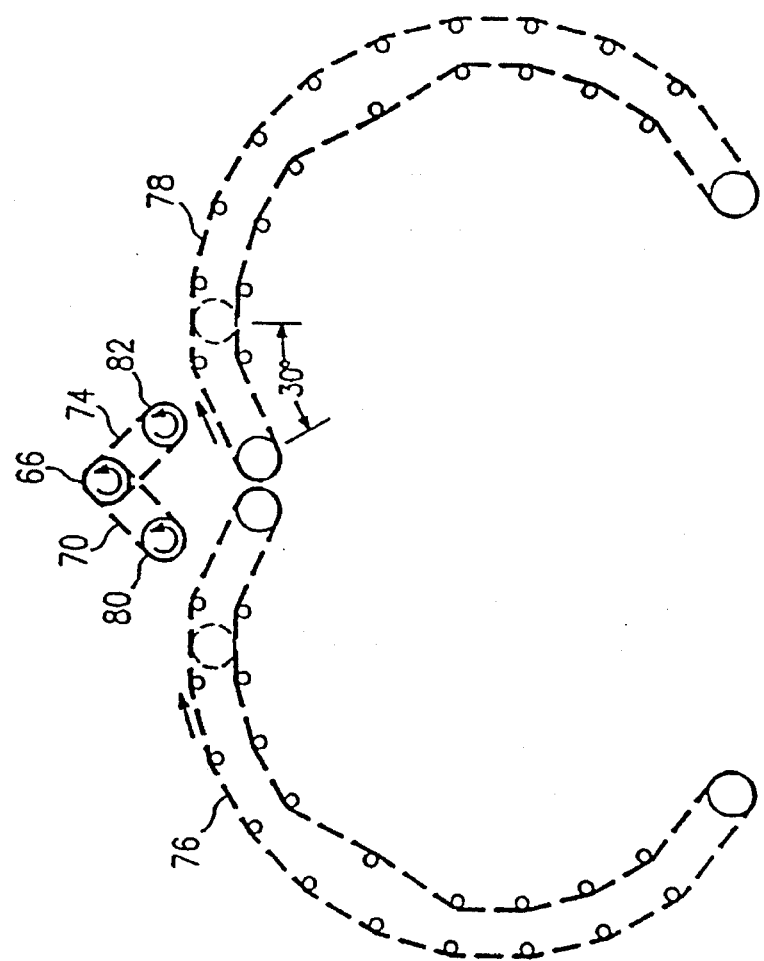
FIG. 10 is an illustrative view of the chain drive in the removal position.

With reference to FIGS. 9–12, the mechanism for oscillating the nozzles 44 will be described. Mounted atop the centering assembly 24 is a control module 58. Within the control module is a motor 60 with a drive shaft 62 which extends out of the module and through the assembly 36 and extends parallel to the axis 20 of the pipeline when the units are in the operating position. The motor rotates shaft 62 in the direction of the arrow with an adjustable predetermined angular velocity. A first drive gear 64 is mounted on the shaft adjacent the ring 38. A second drive gear 66 is mounted on the shaft adjacent the arcuate ring 40. As seen in FIGS. 10 and 11, the first drive gear drives a first driven gear 68 through a chain 70. The second drive gear drives a second driven gear 72 through a chain 74. Drive gears 68 and 72 are supported from frame member 30 so that the distance between the gears does not vary whether the arms are in the operating or installation and removal position.

Arcuate ring 38 supports a continuous chain 76 which is supported about the periphery of the ring for 30' of the entire length of the ring. Arcuate ring 40 mounts a continuous chain 78 in the same manner.

Figure 9:
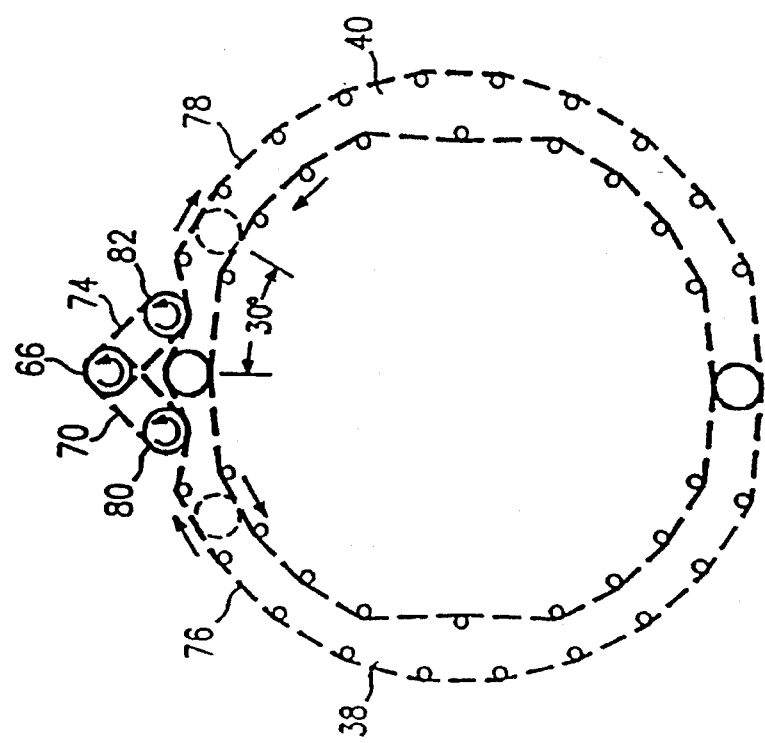
FIG. 9 is a schematic view of the chain drive for the abrasive cleaning nozzles in the operating orientation.
Figure 14:
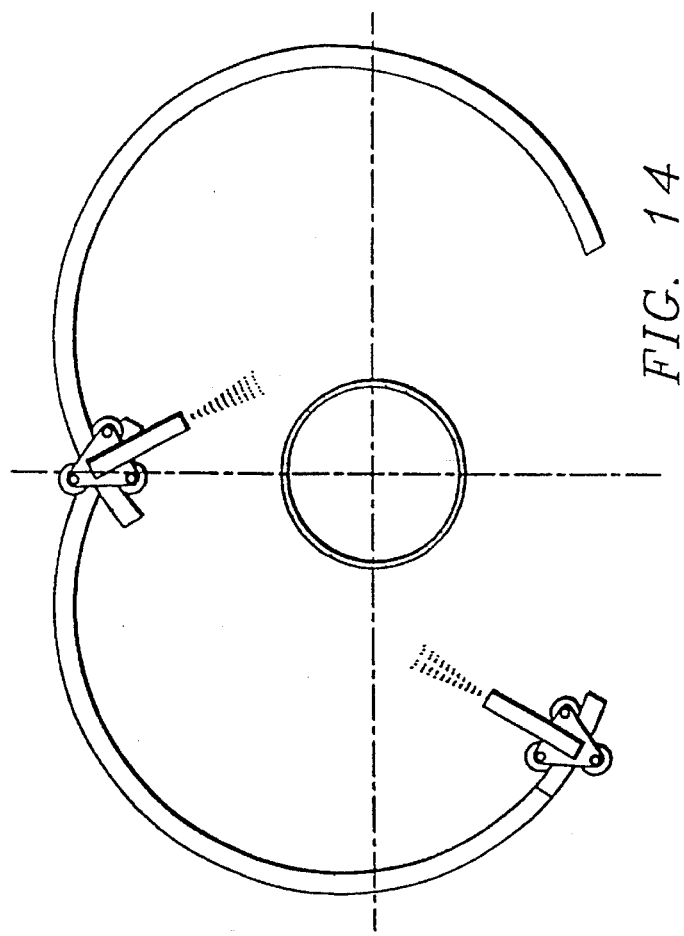
FIG. 14 is an illustrative view of the arcuate rings pivoted to the removal position.

First driven gear 68 drives a gear 80 which engages the chain 76 when the device is in the operating position as shown in FIG. 9. Second driven gear 72 similarly drives a gear 82 which is engaged with chain 78 in the operating position. When cylinders 32 are actuated to pivot arms 26 and 28 into the installation/removal position, the chains 76 and 78 simply move out of engagement with the gears 80 and 82, as best seen in FIG. 10, to disconnect the drive train. Similarly, when the arms are pivoted to the operating position, the chains 76 and 78 re-engage the gears 80 and 82, respectively, to complete the drive train.

In operation, the travel unit 16 will drive the cleaning unit 18 along the pipeline, while the motor 60 oscillates the nozzles 44.

Chains 76 and 78 each have a special link in them which receives a floating pin extending from the nozzle carriage 42 closest to the drive motor. The continuous rotation of chains 76 and 78 translate into oscillation of nozzle carriage 42 about an arcuate distance on rings 38 and 40 determined by the length of the chains 76 and 78. The pin floats a limited direction on a radial line perpendicular to axis 22 when the arms and rings are in the operation position to follow the special link in its travel. If only a single nozzle carriage and nozzle were used on each ring, chains 76 and 78 need only be lengthened to extend about a 180° arc of the periphery of the rings, as shown in FIGS. 9 and 10.

Figure 16:
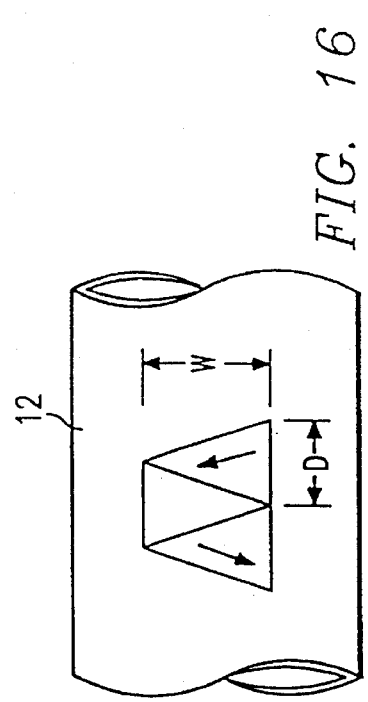
FIG. 16 is an illustrative view of the travel path of the spray from the nozzle.
Figure 13:
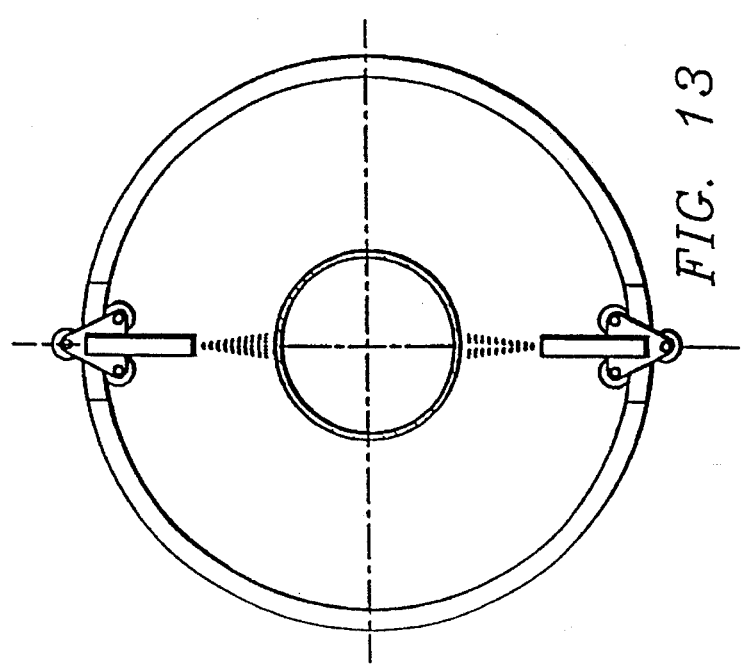
FIG. 13 is an illustrative view of the arcuate rings and abrasive cleaning nozzles in the operating position.

As best seen in FIG. 16, the width W that each nozzle travels should be twice the distance D that the nozzles moves along the pipeline. Further, the arc of reciprocation for the nozzles should be about 360° divided by the number of nozzles to ensure complete coverage of the outer surface of the pipeline. For example, if twelve nozzles are used, six on each of the rings, the arc of reciprocation should be 30°. By following this standard, every area on the pipeline will be covered twice by nozzles as the apparatus moves along the pipeline to ensure cleaning of the pipeline. With such operation, a surface finish of ISO SA 2½ should be possible with a highly angular surface profile of up to 0.003 inches in mean differential to provide a superior base for a new coating.

The centering assembly 24 positions the nozzle carriage assembly 36 on the pipeline and ensures that the nozzles 44 maintain the proper standoff from the pipeline. The control module 58 directs the flow of water and abrasive to the individual nozzles and controls the oscillation of the nozzles. A two part cover 84 is mounted on the arms 26 and 28 to overly the nozzles to protect the operator and other personnel from ricocheting water and abrasive spray.

The high speed water jets in the nozzles accelerate the individual abrasive particles, typically sand, to greatly increase the momentum of the particle and allow it to more efficiently remove contaminants on the pipeline surface and obtain the needed surface profile. The high speed water jet attacks the interface that bonds the coating or contaminant to the pipe itself and removes all loosely bonded material. In addition, the water will dissolve and remove any corrosion causing salts on the pipeline. The erosive action of the abrasive is used to remove the tightly bonded material such as rust and primer and provide the desired surface profile for receiving a new coating. The sled unit 14 is designed to be towed as a separate vehicle behind the travel unit 16 and cleaning unit 18 as they move along the pipeline. The sled unit mounts the control panel for the various functions of the apparatus, and includes a computer to maintain the desired relation between speed of the units along the pipeline and the speed of oscillation of the nozzles. The sled unit also contains high pressure pump units used to provide the high pressure water at nozzles 44. One, two or three pumps can be run in tandem depending on the size of the pipeline to be cleaned and the degree of cleaning desired. Using less than the total number of pumps minimizes water consumption, fuel costs and maintenance when the full capacity is not required. Also, in the event one of the pump units goes off line, another unit can be brought on line quickly to replace it. A quintuplex positive displacement pump with stainless steel fluid and pressure lubricated power ends is a satisfactory pump. Such a pump can be rated at 10,000 psi at 34.3 gallons per minute, for example. The sled unit also contains a compressor to operate the cylinders 32, a generator for electrical power for the motor 60 and to power the air compressor and other controls. Also, the sled unit mounts containers of the abrasive to feed the cleaning unit 18.

The chain drive and single direction rotating motor that oscillate the nozzles provide a smooth ramp up and ramp down of the nozzle operation at the ends of the nozzle path, not possible if a reversing motor is used to oscillate the nozzles. The nozzles slow up smoothly as they reach the end of their oscillation arc and accelerate smoothly as they reverse their motion. This provides a smooth operation. As noted, for twelve nozzles, the arc of reciprocation should be 30°. For ten nozzles, the arc should be about 36°. For eight nozzles, the arc should be about 45°.

The apparatus 10 can be used to apply a new coating to the pipeline as well. Instead of nozzles 44 to apply abrasives and high pressure water jets, the nozzles 44 can be used to spray a polyurethane coating on to the pipeline. A polyurethane coating of the type that can be used for such coating is sold under the trademark and identification PROTOGOL UT 32 10 and is manufactured by T.I.B.-Chemie, a company located in Mannheim, West Germany. This polyurethane material is a two part material, one part being a resin and the other an isocyanate. When the two parts are mixed in a 4 to 1 ratio of resin to isocyanate, the material sets up in a hard state within thirty seconds of mixing. The apparatus 10 thus is an ideal device to apply such a spray in a continuous manner along the pipeline, providing, with the nozzle overlap, complete coating of the pipeline to the desired coating thickness as the apparatus moves along the pipeline. After the polyurethane has been applied, solvent will be driven through the nozzles and supply passages to prevent the polyurethane from hardening and ruining the apparatus. It is also possible to use only one oscillating nozzle per ring to apply the coating by oscillating each nozzle 180° or so and moving the unit along the pipeline to insure complete coverage. It is also possible to mount a plurality of nozzles in a fixed position on rings 38 and 40 for either cleaning or coating if oscillation is not desired.

Reference is now made to FIGS. 17–27 which illustrate a second embodiment of the present invention identified as automated pipeline treating apparatus 100. Many of the components of apparatus 100 are identical and work in the same manner as components of apparatus 10. Those components are designated by the same reference numerals in FIGS. 17–27.

Apparatus 100 is illustrated using only two nozzle carriage assemblies 36 and nozzles 44 in the apparatus. In contrast to apparatus 10, the nozzle carriage assemblies lie in the same plane perpendicular to the axis 20 of the pipeline, instead of being staggered along the length of the pipeline as in apparatus 10. This is made possible by providing a carriage mounting ring 102 on arm 26 and a carriage mounting ring 104 on arm 28, with each ring extending an arc of somewhat less than 180° so that there is no interference between the rings as the apparatus is placed in the operating position. A chain drive ring 106 is mounted to arm 26 adjacent to carriage mounting ring 102. A similar chain drive ring 108 is mounted on arm 28 adjacent to ring 104. Rings 106 and 108 are also somewhat less than 180° in arc to avoid interference when the apparatus is in the operating position.

Figure 23:
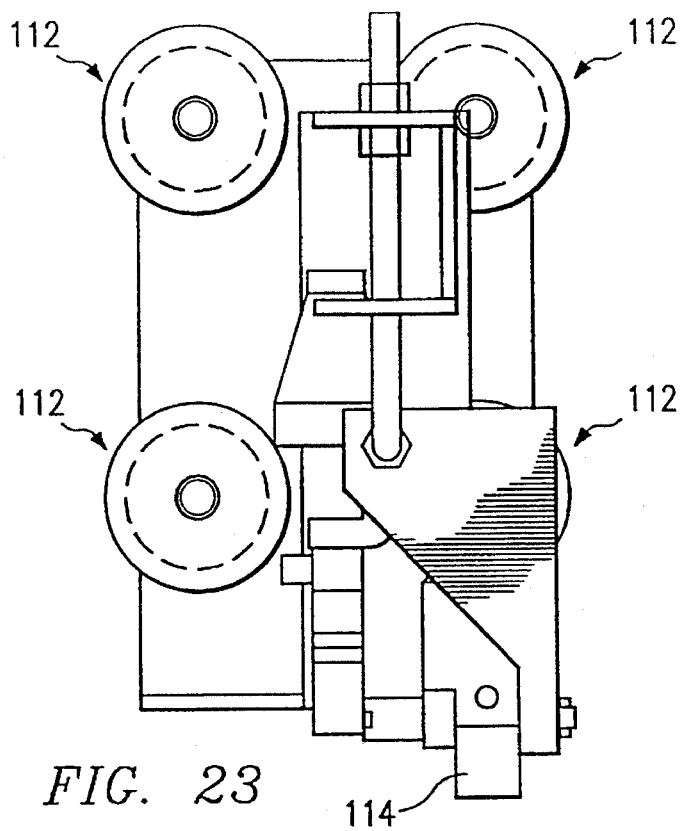
FIG. 23 is an end view of a nozzle carriage and nozzle of the apparatus of FIG. 17.
Figure 24:
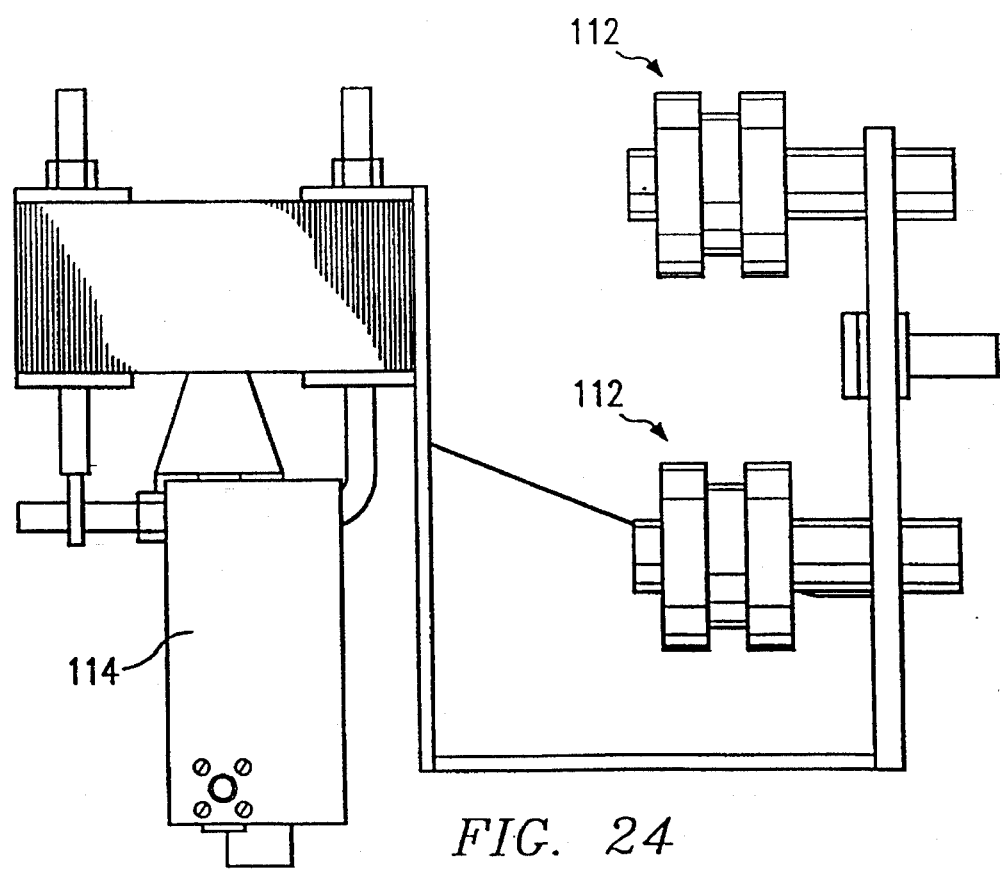
FIG. 24 is a side view of the nozzle carriage and nozzle of FIG. 23.

As best illustrated in FIGS. 23 and 24, the nozzle carriage assembly 110 is provided with four guide wheels 112, two of which run on the inner rim of a carriage mounting ring, and the other two running on the outer rim of the carriage mounting ring, to support the nozzle carriage assembly for arcuate motion along the ring. The nozzle 114 itself can be adapted for high pressure water jet cleaning using abrasives, as nozzle 44, or as a nozzle to distribute a pipeline coating such as the two part polyurethane mentioned previously. FIG. 24 illustrates the mounting of pin 116 on the carriage assembly 110 which is permitted to move a limited distance vertically as shown in FIG. 24 as it follows the special link in the drive chain in oscillation.

Figure 25:
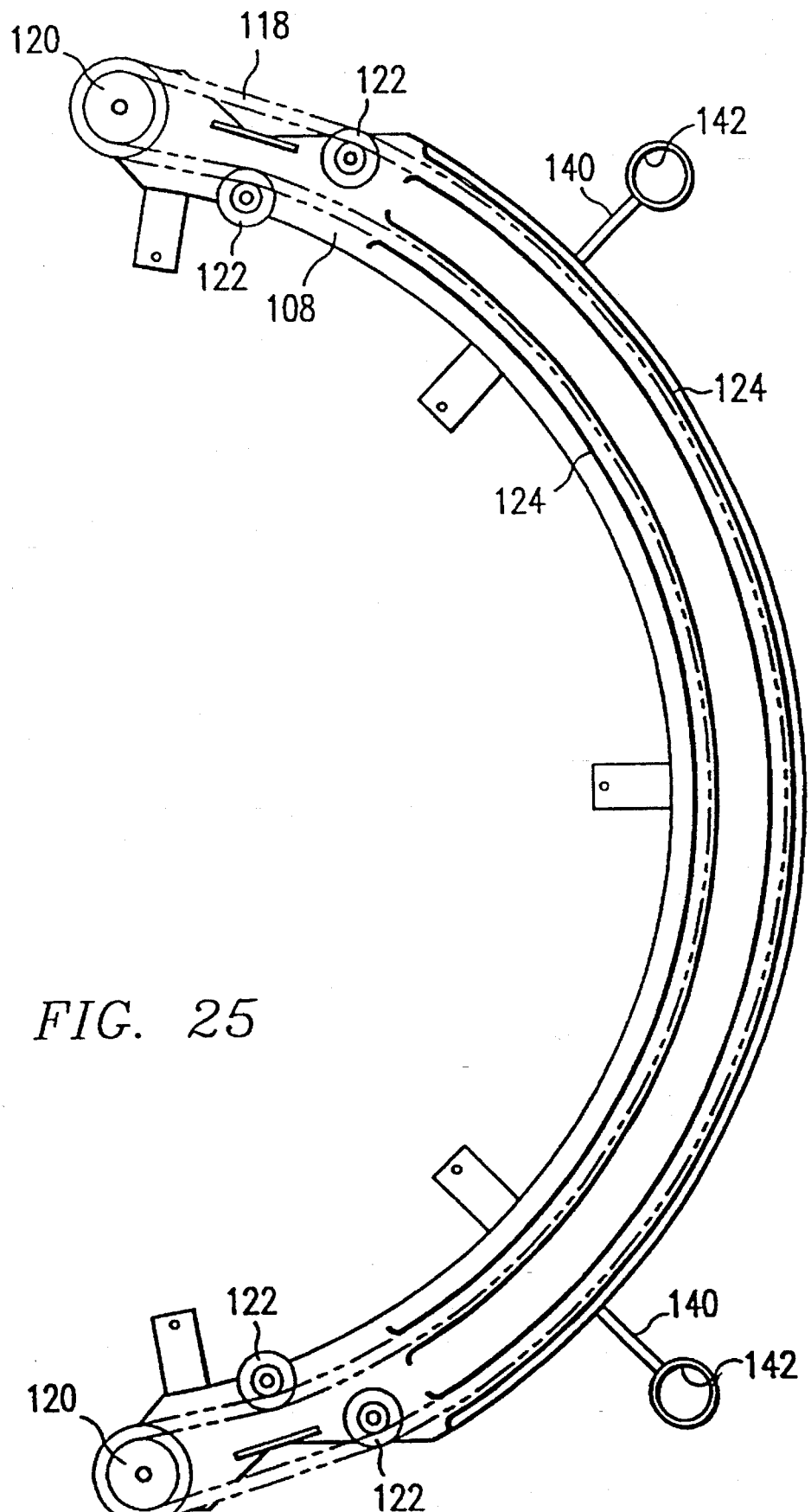
FIG. 25 is an end view of the drive ring assembly of the apparatus of FIG. 17.

With reference to FIG. 25, the details of the chain drive ring 108 can be better described. As only a single nozzle is mounted on the associated carriage mounting ring, it will be desirable to have the nozzle carriage assembly and nozzle oscillate 180°. Thus, the continuous chain 118 mounted on the chain drive ring 108 extends about the entire periphery of the drive ring and is supported by tensioning wheels 120 and 122. Guides 124 are also provided to guide the chain about the ring.

Figure 22:
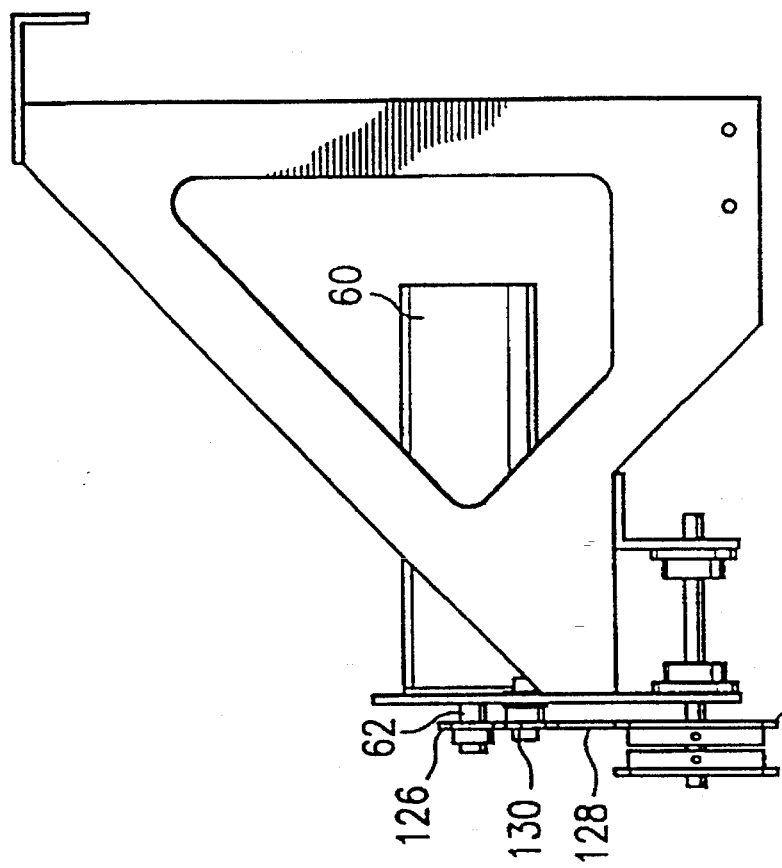
FIG. 22 is a side view of the chain drive of FIGURE
Figure 21:
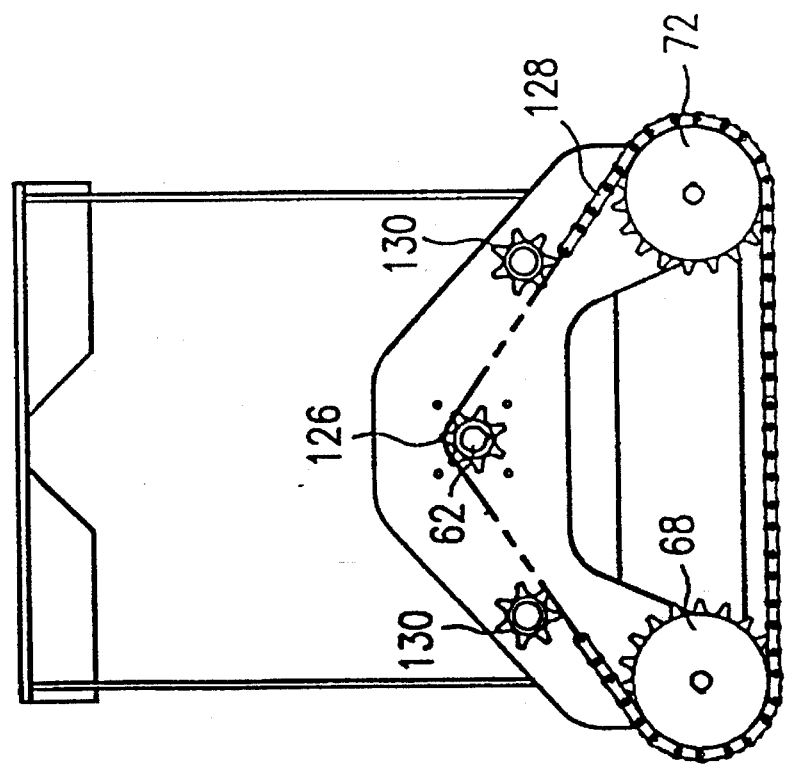
FIG. 21 is an end view of the chain drive of the apparatus of FIG. 17.

With reference to FIGS. 21 and 22, the nozzle oscillating driving elements of apparatus 100 are illustrated. The motor 60 drives a single drive gear 126 from its drive shaft 62. A continuous chain 128 connects drive gear 126 with driven gears 68 and 72. Tensioning gears 130 allow for tensioning of the chain. It can be seen in apparatus 100 that the positioning of the rings 102 and 104 in a parallel plane permits a single drive gear 126 to operate the nozzles being oscillated.

With references to FIGS. 17–20, arm 26 can be seen to have parallel bars 132 and 134 extending from the arm parallel to the axis 20 of the pipeline which supports the nozzle carriage assembly 36. Arm 28 has a similar pair of bars 136 and 138 which extend parallel the axis 20. The chain drive rings 106 and 108 are supported on the bars through brackets 140 which have cylindrical apertures 142 so that the rings can be slid over the bars and supported thereby. The carriage mounting rings 102 and 104 have similar brackets 144 as best seen in FIG. 20.

To isolate the nozzle action from the remainder of the pipeline and apparatus other than that being treated, semicircular annular plates 146 and 148 are mounted on arms 26 and 28, respectively, which lie in a plane perpendicular axis 20 and are closely fit around the outer circumference of the pipeline to isolate the components of the centering assembly from the portion 150 of the pipe being treated. Each semicircular annular plate includes a semi-cylindrical shield 152 which extends from the plate concentric with the pipeline radially inward of the carriage mounting rings, chain drive rings and nozzles. An aperture 154 must be formed in the shield 152 at the position of each of the nozzles used so that the nozzles spray passes through the associated aperture to impact on the outer surface of the pipeline. Where, as shown in apparatus 100, the nozzles will move approximately 180°, the aperture 154 must extend roughly a similar arcuate distance.

Figure 27:
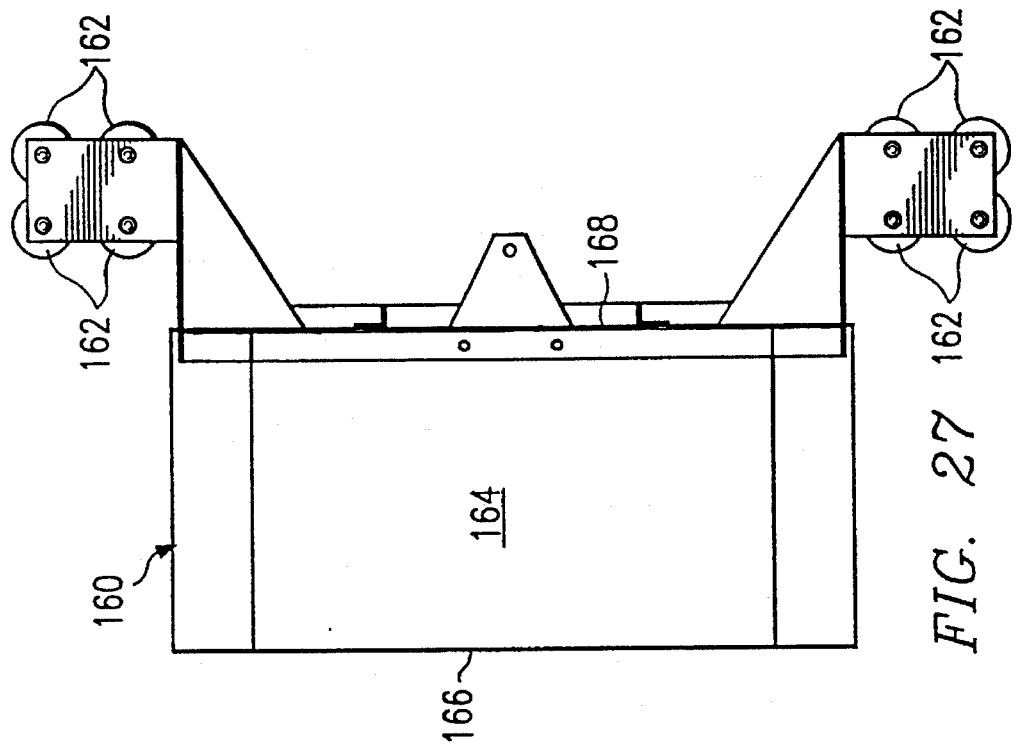
FIG. 27 is a side view of the shield assembly.
Figure 26:
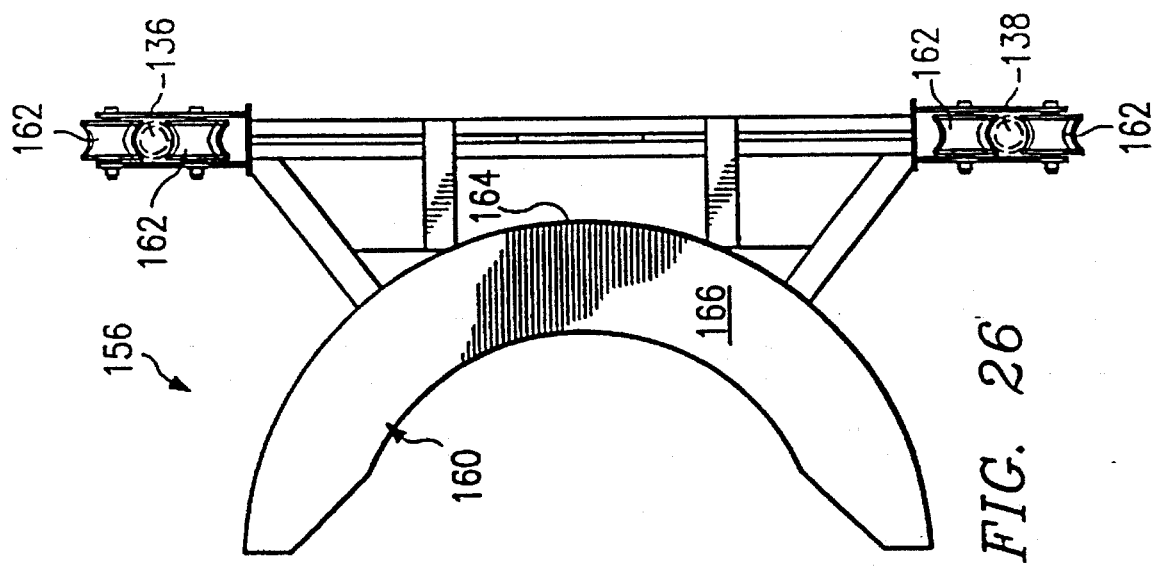
FIG. 26 is an end view of a shield assembly in the apparatus of FIG. 17.
Figure 28:
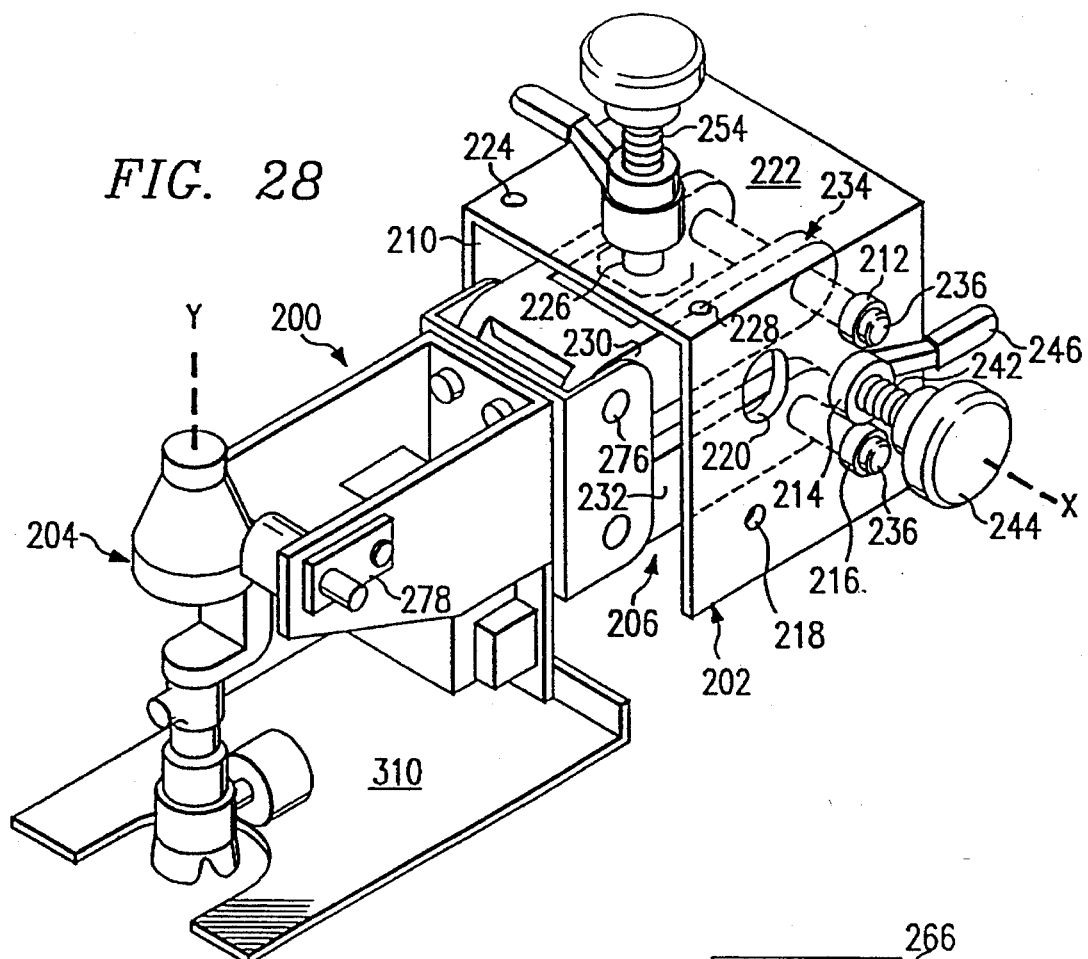
FIG. 28 is a perspective view of a nozzle assembly forming a third embodiment of the present invention.
Figure 29:
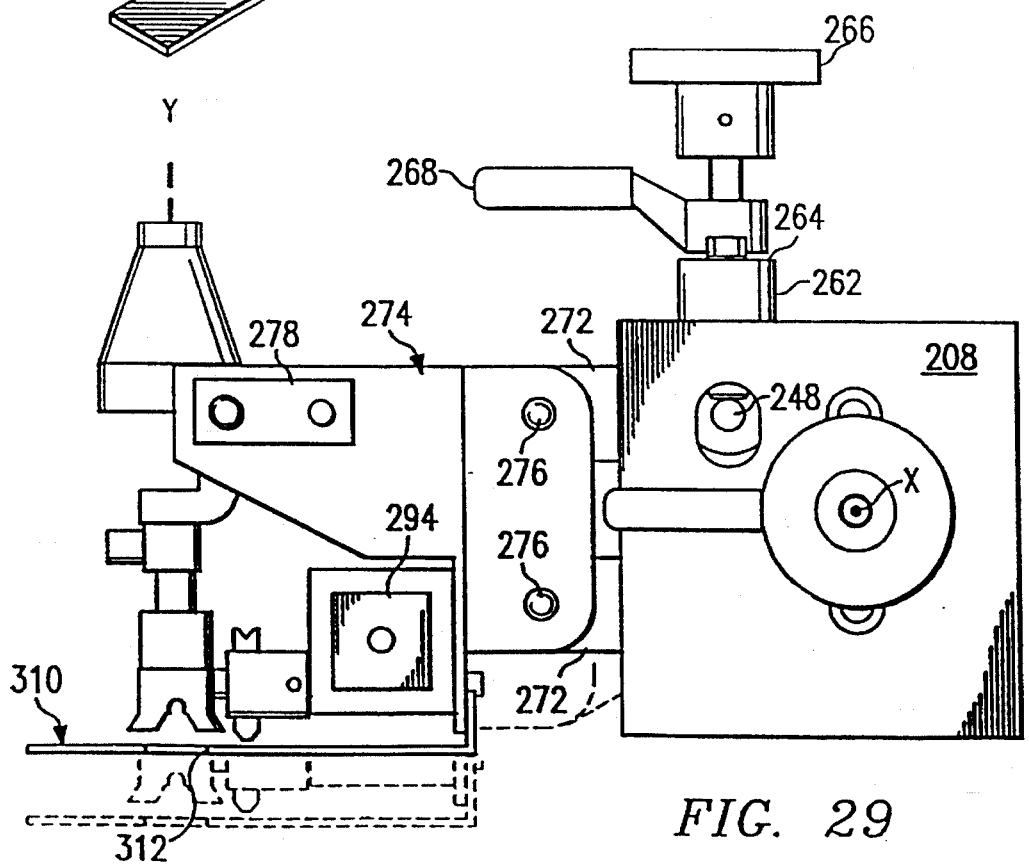
FIG. 29 is a side view of the nozzle assembly.

With reference to FIGS. 26 and 27, a two part shield assembly 156 including shield 158 and shield 160 are mounted on the bars 132–138.

Figure 18:
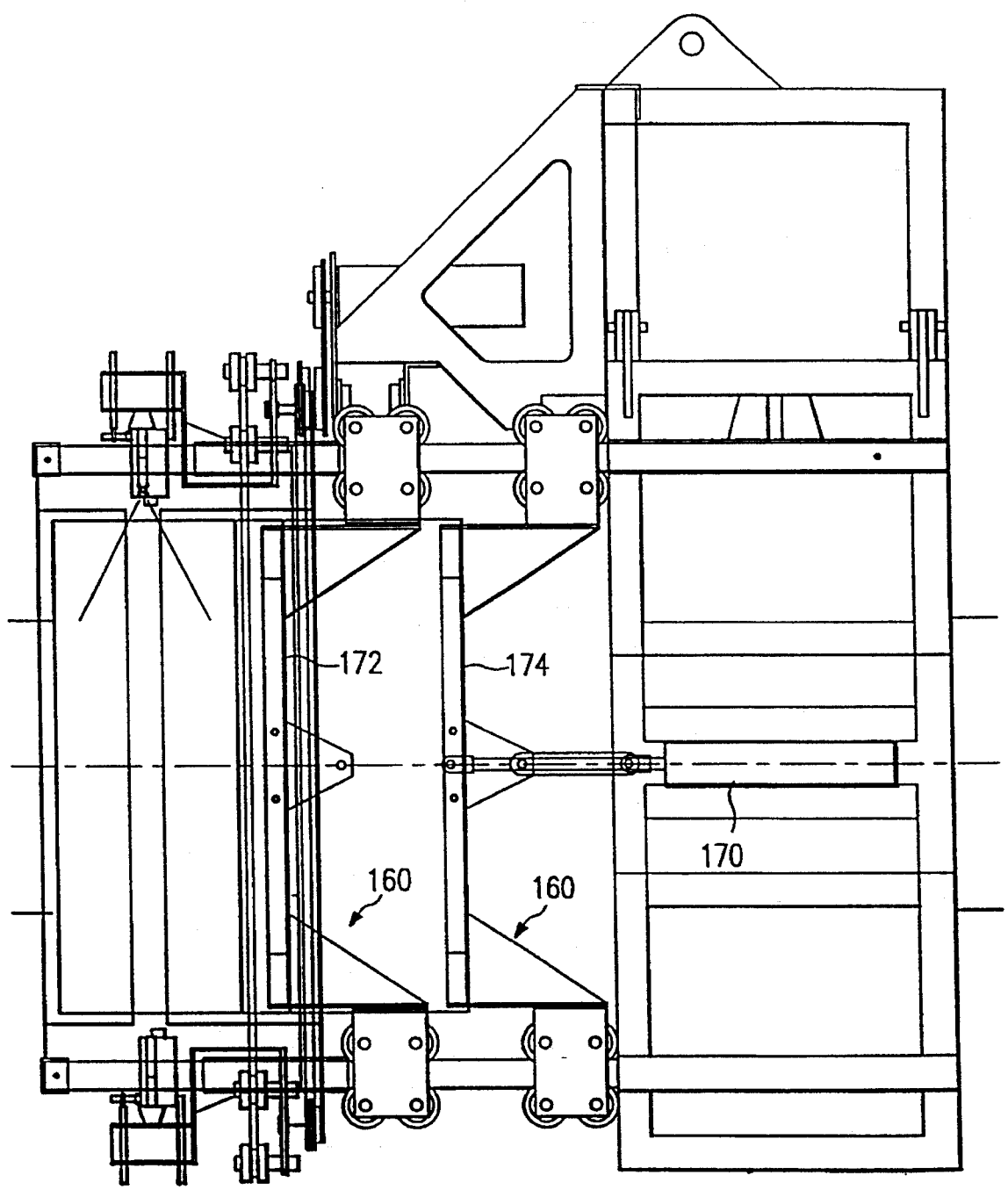
FIG. 18 is a side view of the apparatus of FIGURE
Figure 19:
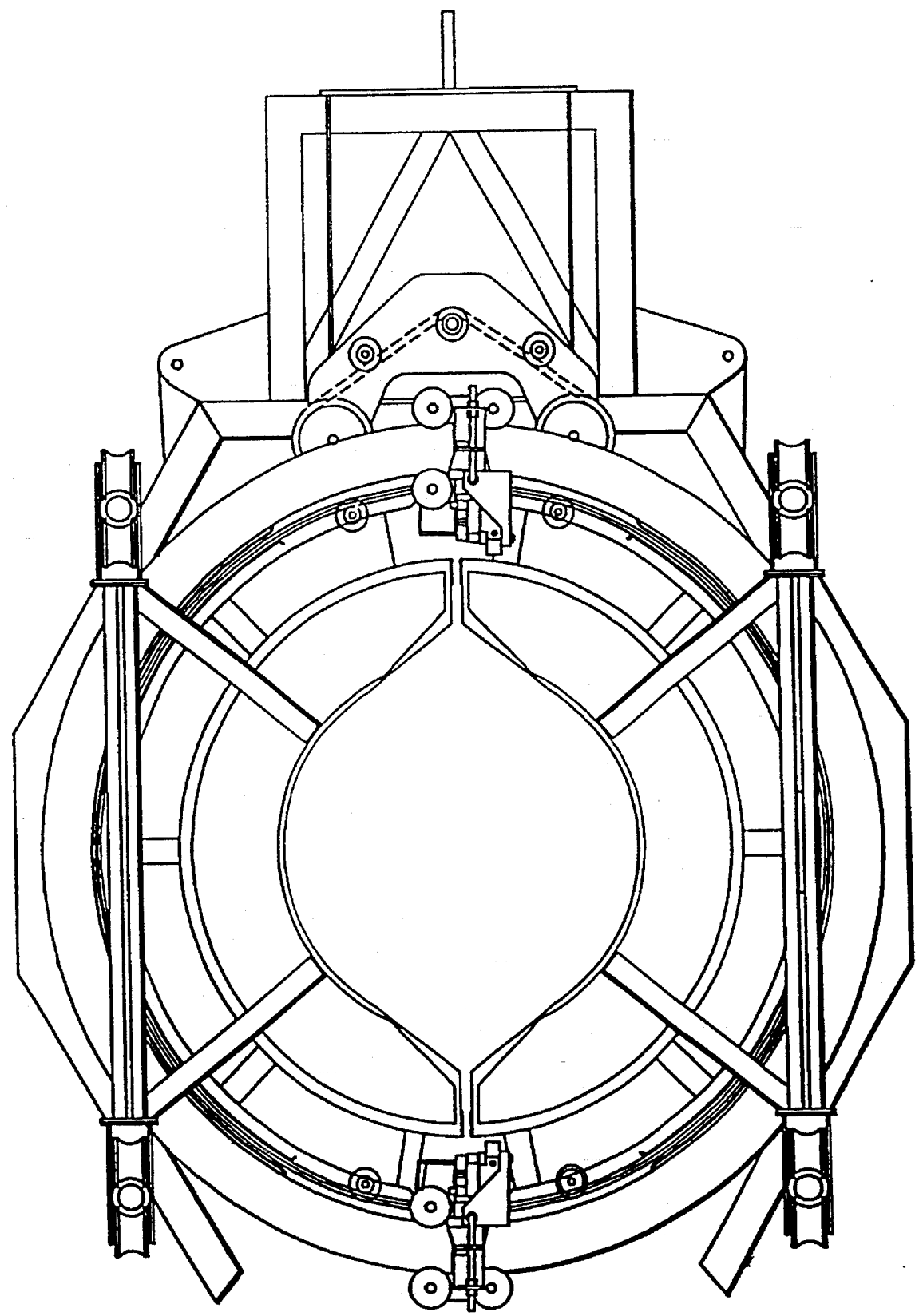
FIG. 19 is a simplified end view of the apparatus of FIG. 17.

Shield 160 illustrated in FIGS. 26 and 27 can be seen to include wheels 162 for guiding the shield along bars 136 and 138. The shield 160 includes a semi-cylindrical concentric plate 164, and annular plates 166 and 168 which extend in a radial direction from the axis 20 of the pipeline. A pneumatic double acting cylinder 170 is mounted on each of the arms 26 and 28 to move the shields 158 and 160 along the bars between a first position 172 and a second position 174 as seen in FIG. 18. In the first position 172, the plate 164 fits concentrically within the shields 152 and radially inward from the nozzles. Thus, the shields 158 and 160 prevent either the high pressure water jet or coating discharged from the nozzles from contacting the pipeline surface. In the first position, the annular plates 166 and 168 prevent the discharge of the nozzles from spraying either direction along the axis of the pipeline.

In the second position 174, the shields 158 and 160 are moved to permit the nozzle spray to impact on the portion 150 of the pipeline being treated. However, the annular plate 166 will prevent the spray from escaping from the apparatus in the direction of arrow 22.

The use of shield assembly 156 can have a number of benefits when coating a pipeline, for example. It may be desirable to leave a short length of the pipeline uncoated, for example, at a weld, and this can be achieved without stopping the motion or operation of the apparatus along the pipeline by simply drawing the shield assembly into the first position for a sufficient period of time to prevent the coating over the desired gap. Once the gap is passed, the shield assembly 156 can be returned to the second position and coating of the pipeline can continue without interruption.

To insure consistent cleaning, surface preparation and even coverage of the coating material being applied, it is desirable if the spray nozzle position can be adjusted. The spray nozzles may vary in the width of the spray pattern, profile of the pattern, and size of the orifice. These variations are a result of the manufacturing tolerances encountered in the manufacturing of the spray nozzle. Variations will also occur as the spray nozzle wears during operation.

The amount of material (water, water and abrasive, and/or coating) directed or applied to the surface of the pipe per unit of time is affected by the variables listed above. The spray exits the spray nozzle in a "fan" pattern. The closer a spray nozzle is to the surface of the pipeline, the smaller the "footprint" made by the spray on the pipeline. As the width of the spray pattern at a specified distance from the spray nozzle may vary, the desired spray "footprint" on the pipeline can be obtained if the distance of the spray nozzle from the pipeline can be adjusted.

During the operation of the spray nozzles, the nozzles become worn and the fan pattern width at a given distance will decrease. To compensate for this wear and to prolong the useful life of the spray nozzle, it is necessary to increase the distance of the spray nozzle from the pipeline. This should be done frequently to insure optimum performance.

The profile of the spray pattern may vary also. This can result in the pattern being skewed to one side or the other. Skewing of the fan pattern can cause a portion of the fan pattern to miss the desired target on the pipeline. This skewing can be severe enough that a portion of the spray pattern may actually miss the pipeline entirely, causing inefficiencies and loss of water, water and abrasive, or coating material. To compensate for this, the spray nozzle needs to be moved arcuately, along the arcuate ring.

The size of the orifice can vary from spray nozzle to spray nozzle. The larger the orifice, the greater amount of material that will exit the nozzle per unit of time. The sprayed material exits the nozzle in a "fan" pattern, consequently the amount of spray material contacting the pipeline per square inch per unit of time can be decreased by increasing the distance of the spray nozzle from the pipeline.

To compensate for these numerous factors it is desirable to be able to adjust the distance of the spray nozzle from the pipeline and the position of the spray nozzle around the arcuate ring. Further, these adjustments must be made while the unit is operating so the adjusting mechanism must be capable of being operated by worker in bulky protective clothing and heavy gloves. The adjustments, once made, should be able to get "locked" in to prevent the spray nozzle position from changing due to vibration or operation of the equipment.

When spraying water, water and abrasive, or coating materials, the orifice of the spray nozzle will occasionally become partially of completely plugged with foreign matter. This will distort the spray pattern if partial blockage occurs and reduce the amount of material per unit of time being sprayed through the nozzle. This problem is particularly significant when rapid set coating materials are used. If spray nozzle blockage occurs in this situation and flow cannot be restarted quickly, the coating material in the system will set up and require stopping work and rebuilding the entire system.

Many times this blockage can be removed from the spray nozzle if the spray nozzle can be rotated 180° and the blockage "blown out" of the spray nozzle using the high pressure water, water and abrasive or coating. The nozzle can then be rotated back to the operating position and commence spraying.

With reference now to FIGS. 28–38, a nozzle assembly 200 is illustrated which forms another embodiment of the present invention. The nozzle assembly 200 will replace a cleaning nozzle 44 and can be mounted either on nozzle carriages 42 or directly on an arcuate ring, such as rings 38 and 40. The nozzle assembly 200 provides for reversing the tip of the nozzle for cleaning. The nozzle assembly 200 further provides for adjusting the position of the nozzle in both the Y direction along a radius from the center line of the pipe being coated or cleaned and the X direction, about the circumference of the pipe to provide a proper spray pattern on the exterior surface of the pipe. Such adjustments are of great benefit as each nozzle will have a slightly different spray pattern due to manufacturing variations and, as the spray nozzle wears, the spray pattern will change. Thus, the nozzle assembly 200 provides a mechanism for initially setting the spray pattern for optimal cleaning or coating and allows the operator to adjust the nozzles as they wear to maintain the optimum coating or cleaning, while extending the useful service life of the nozzle.

With reference now to FIGS. 28–31, the nozzle assembly 200 can be seen to include a bracket 202 which is rigidly secured to the nozzle carriage assembly or ring and is thus in a fixed relation to the pipe being cleaned or coated during the operation. A spray gun 204 is mounted to the bracket 202 through a parallel arm assembly 206 which allows predetermined movement of the spray gun 204 in the Y direction, toward or away from the outer surface of the pipe. The parallel arm assembly 206, in turn, is mounted to the bracket 202 by a mechanism which allows it, and the attached spray gun 204, to be moved in the X direction, along the circumference of the pipe.

The bracket 202 includes sides 208 and 210 in which are formed a series of aligned holes 212, 214 and 216 extending along the X direction. Spaced from the series of holes 212–216 are aligned holes 218 and aligned elongated openings 220. The bracket 202 also includes a top 222 which has a series of holes 224, 226, and 228 formed therethrough which extend along the Y direction.

As seen in FIGS. 28–31, the parallel arm assembly includes an upper arm 230 and a lower arm 232. The first ends 234 of each of the arms 230 and 232 are supported for limited movement in the X direction by a pair of pins 236 received in aligned holes 212 and 216 of the bracket 202. Also mounted along the pins for movement in the X direction, and captured between the first ends 234, is a threaded adjustment nut 238. The nut 238 has a threaded aperture 240 which aligns with holes 214 in the bracket 202. A threaded screw 242 is mounted to the bracket 202 through holes 214 for rotation about a longitudinal axis parallel the X direction, but is prevented from motion along the X direction. A knob 244 and clamping handle 246 are mounted at one end of the screw. The screw is threaded through the aperture 240 in nut 238. Thus, as the knob 244 is rotated one way or the other, the nut 238, arms 230 and 232 and assembly 206 are moved in the X direction. Because the spray gun 204 is attached to the parallel arm assembly 206, the gun is similarly traversed in the X direction. Once a desired position has been achieved, the handle 246 can be rotated to lock the screw relative to the bracket 202 to prevent movement of the spray gun.

Figure 32:
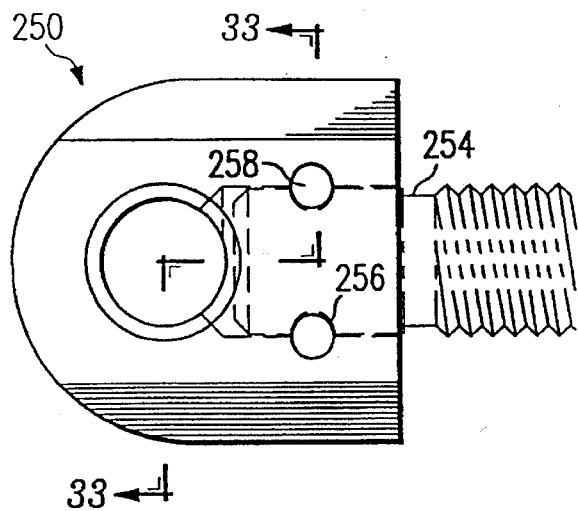
FIG. 32 is a side view of the nut to adjust the gun in the y direction.
Figure 33:
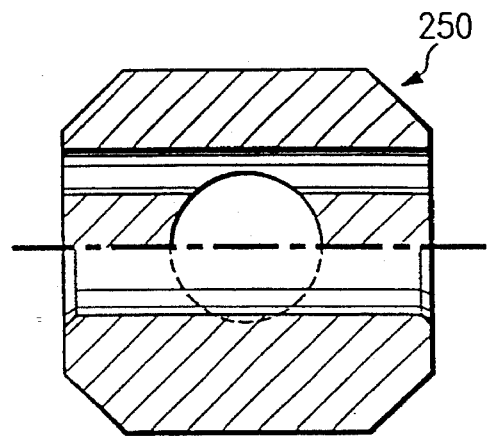
FIG. 33 is a top view of the nut of FIG. 32.

Movement of the spray gun in the Y direction is accomplished in the following manner. A rod 248 is mounted on the upper arm 230 which extends along the X direction. A nut 250, best shown in FIGS. 32 and 33, is slidable along rod 248 and has an aperture 252 to receive the end of a threaded screw 254. The threaded screw 254 has a groove 256 formed in the end thereof which is positioned within the aperture 252 adjacent to holes 258 in the nut. Holes 258 receive pins to prevent the threaded screw 254 from pulling out of the aperture 252, but allow the threaded screw to rotate within the aperture. A block 262 is mounted on the top 222 of the bracket 202 through holes 224 and 228 and has a threaded aperture 264 aligned with hole 226 through which the screw 254 is threaded. A knob 266 and clamping handle 268 are mounted at the end of the threaded rod exterior of the bracket. Rotation of the knob will cause the threaded screw to move up or down in the Y direction relative to the block 262. This, in turn, causes the parallel arm assembly 206 and the spray gun 204 to move in the Y direction as well. While the actual movement of the spray gun is along a curved arc, the relatively minor travel along the Z direction is inconsequential while achieving the proper position in the Y direction. Preferably, the rod 248 extends into the elongated openings 220 in the bracket 202 which predetermines the range of motion in the Y direction between the ends of the openings 220.

The second ends 272 of the parallel arm assembly 206 are pivotally attached to a gun mount bracket assembly 274 with a pair of removable pins 276 such as sold by Reed Tool. Each removable pin has a spring detent which holds the pin in place during normal operation, but allows the pin to be readily removed by simply pulling the pin out to allow the gun to be removed for cleaning.

Figure 34:
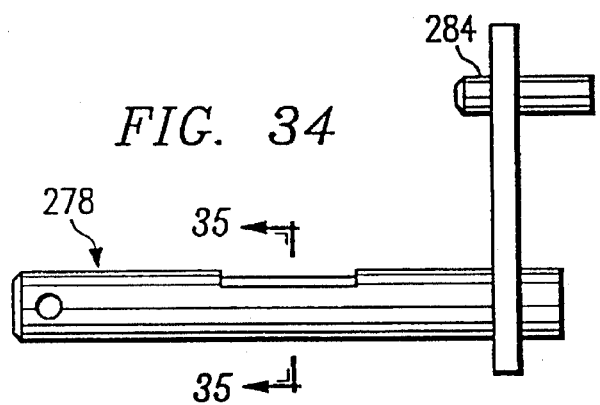
FIG. 34 is a side view of the gun mount pin.
Figure 35:
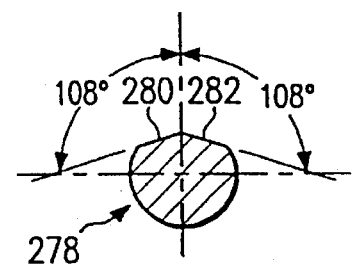
FIG. 35 is a cross-sectional view taken through lines 35—35 in the direction of arrows in FIG. 34.

The spray gun 204 is mounted to the bracket assembly 274 with a gun mount pin 278 as seen in FIGS. 34 and 35. Spray gun 204 can, for example, be a Model 24AUA AutoJet Automatic Spray Gun manufactured by Spraying Systems Co., North Avenue at Schmale Rd., Wheaton, Ill. 60187. This gun has a T-handle screw to lock the gun onto a pin 278. The gun mount pin 278 has a pair of flats 280 and 282 which allows the spray gun 204 to be clamped to the pin at a predetermined orientation as the end of the T-handle screw on the gun will be tightened on one of the flats. The pin 278 has an orienting extension 284 which fits into an alignment hole in the bracket assembly 274 to orient the pin relative to the bracket assembly. Thus, the angle of the spray gun 204 will be set relative to the nozzle assembly 200. Two flats 280 and 282 are provided so that the pin can be inserted from either side of the bracket assembly and properly orient the spray gun.

In the design of the present invention, the X and Y movements can be adjusted simultaneously, which gives the operator great flexibility in adjusting the spray pattern.

Figure 36:
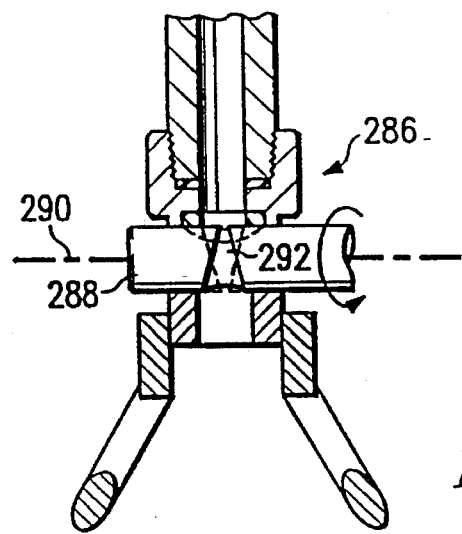
FIG. 36 is a cross-sectional view of the reversible nozzle.

With reference to FIGS. 36–38, the operation of the reversible nozzle 286 will be described. The tip 288 of the nozzle can be rotated within the nozzle about an axis 290 perpendicular the direction of the aperture 292 through the nozzle. This permits the tip 288 to be reversed and cleaned by the flow through the nozzle. Such a nozzle is sold by Graco, Inc., P.O. Box 1441, Minneapolis, Minn. 55440-1441 as their Rack IV nozzle, Patent No. 222-674. This nozzle was meant to be operated manually with a finger operated T-handle, however, the nozzle is modified to attach the tip 288 to a ball valve operator 294. Ball valve operator 294 is designed to rotate a shaft 296 180° in one direction, and the same in the reverse direction as would normally be done to activate a ball valve. An adapter 298 as seen in FIGS. 37 and 38, connects the shaft 296 of the ball valve operator to the tip 288 of the nozzle 286. The adapter 298 has an aperture 300 for a pin to pass through the adapter and the shaft 296 to insure joint rotation. A notch 302 in the end of the adapter 298 receives the T-handle of tip 288. Thus, activation of the ball valve operator 294 will cause the tip 288 to reverse and then return to normal operation position. A suitable ball valve operator is manufactured by the Whitey Valve Company of 318 Bishop Rd., Highland Height, Ohio 44143, as an air actuator for ball valves, Series 130, 150 and 121, and is air solenoid activated.

When the nozzles 286 are used to spray two component coatings, particularly ones that set within the space of thirty seconds, it is very important to be able to reverse the tip 288 for cleaning. An operator may observe that the spray pattern is becoming non-uniform, indicating the beginning of a clog in the tip. The operator 294 then reverses the tip so that the flow through the spray gun tends to clean out the tip. Usually, it is sufficient to maintain the tip in the reverse position for only two or three seconds for adequate cleaning. The tip is then reversed by the operator to the normal operating position where the spray pattern should be uniform.

The gun mount bracket assembly 274 also is provided with a shield 310. A rectangular aperture 312 is formed through the shield for passage of the spray from the nozzle. Since the shield 310 travels with the nozzle in both the X and Y direction, the aperture size can be minimized to reduce back spray which could clog or build up on the nozzle assembly and adversely effect performance.

A pipeline treating apparatus 350, forming a third embodiment of the present invention is illustrated in FIGS. 39–56. The apparatus 350 is again used for treating the exterior surface of pipeline 12 as will be described hereinafter.

Figure 40:
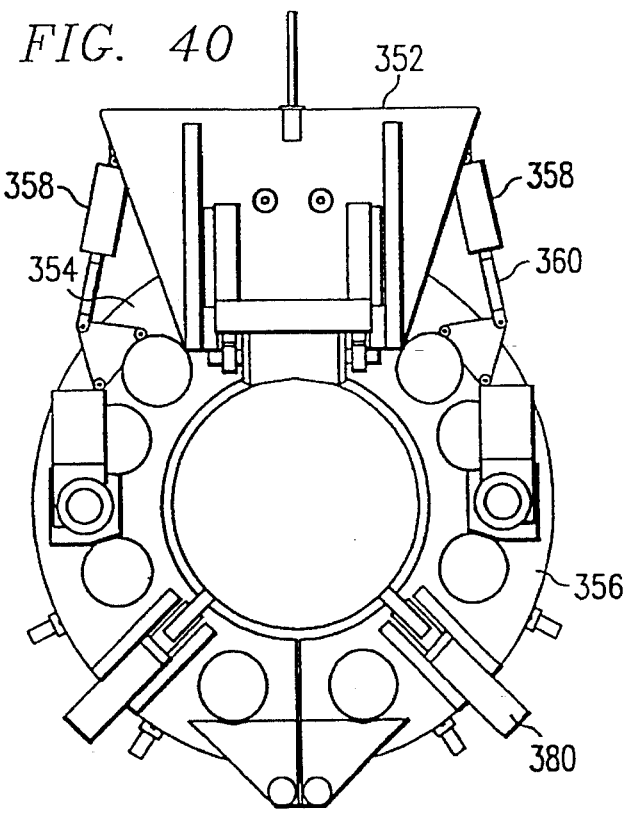
FIG. 40 is a back view of the apparatus of FIG. 39.
Figure 41:
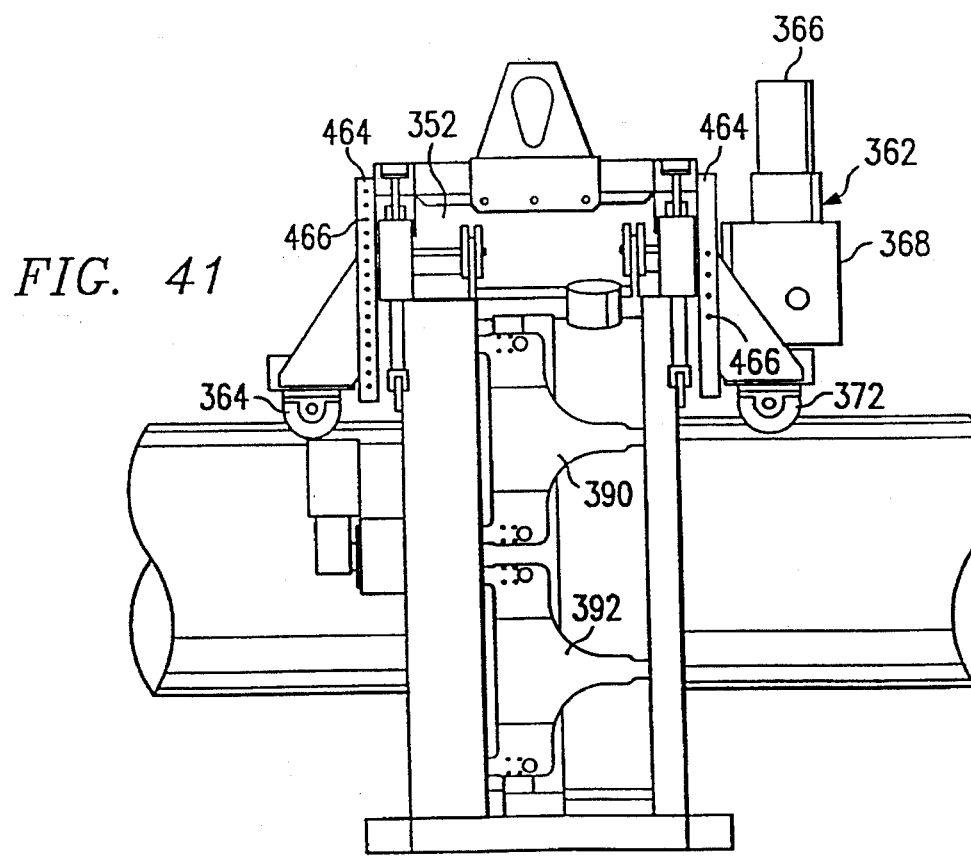
FIG. 41 is a side view of the apparatus of FIG. 39.
Figure 42:
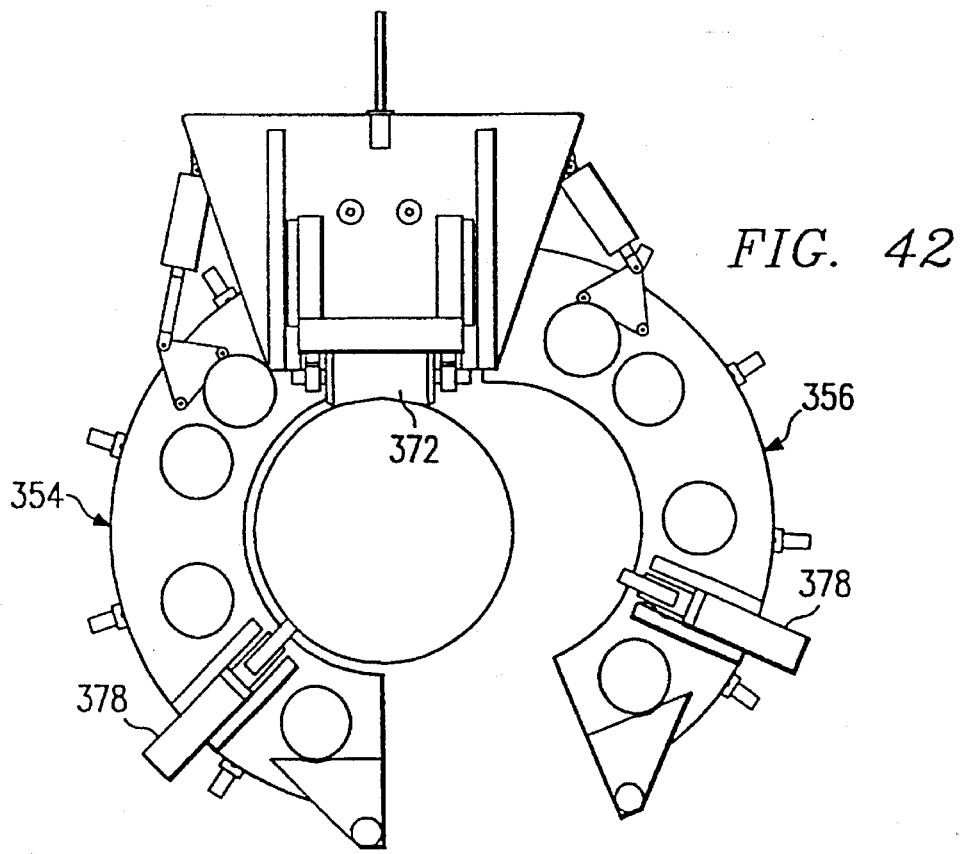
FIG. 42 is a front view of the apparatus of FIG. 39.
Figure 43:
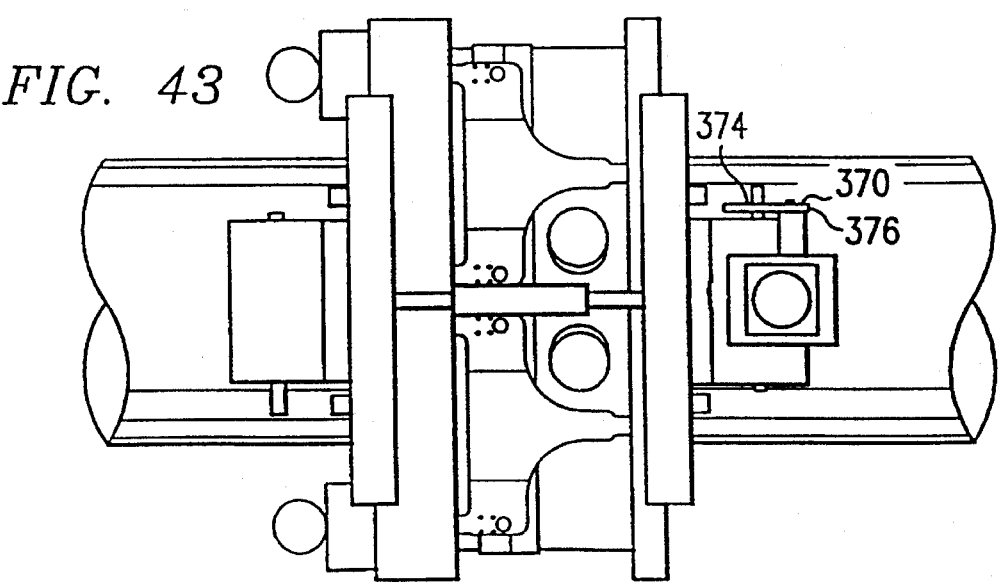
FIG. 43 is a top view of the apparatus of FIG. 39.

The apparatus includes a main frame 352 which is set atop the pipeline 12 and pivotally mounts a wing 354 and a wing 356 which enclose a length of the pipeline in the closed position. As can best be seen in FIGS. 39–43, a pair of air cylinders 358 are pivotally mounted on each side of the main frame 352 and the pistons 360 thereof are pivotally secured to the adjacent wing. Retraction of the pistons 360 into the air cylinders will cause the wings to pivot away from the pipeline (as shown by wing 356 in FIG. 42), allowing the apparatus to be removed from the pipeline. Installation is performed by pressurizing the cylinder to pivot the wings into the closed position, as seen in FIGS. 39–41 for treatment of the pipeline. An auxiliary mechanical clamp, not shown, can be used to secure the wings in the closed position in lieu of or in supplement to maintaining pressure in the cylinders 358 to hold the wings in the closed position.

Mounted at the front of the main frame 352 is a drive assembly 362. Mounted at the back of the main frame 352 is an idler roller 364. The drive assembly 362 includes a motor which drives a gear reduction unit 368 with an output at gear 370. A driven roller 372 is mounted on the assembly and engages the top of the pipeline. A gear 374 is secured at one end of the roller and a chain 376 interconnects the gears 370 and 374 to transmit rotation from the motor to the drive roller 372. In this manner, the apparatus can be moved along the pipeline as desired.

As can be seen in FIGS. 39–43, each wing also mounts a front idler wheel 378 and a back idler wheel 380 which engage the surface of the pipeline when the wings are in the closed position. In the closed position, wheels 378 and 380 and rollers 364 and 372 are about 120° apart about the circumference of the pipeline.

Figure 44:
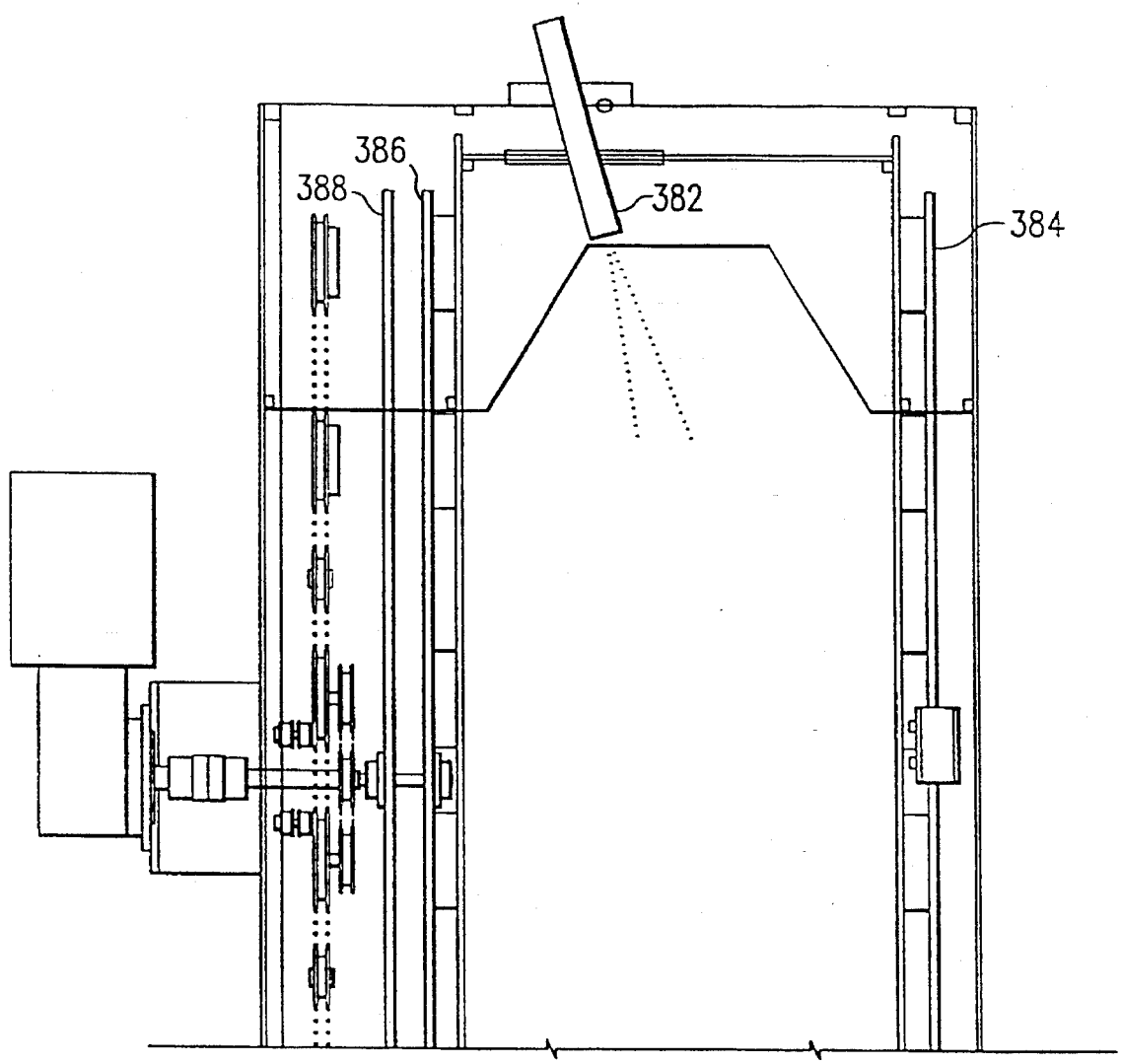
FIG. 44 is a cross-sectional view of the apparatus.

With reference now to FIG. 44, certain of the internal components of the apparatus will be described. Each of the wings mounts four separate nozzles 382 to perform the operation on the pipeline. As will be described, each nozzle is oscillated almost 45° in an arc lying in a plane perpendicular to the center axis of the pipeline so that every bit of the outer surface of the pipeline will be treated. The nozzles discharge against the outer surface of the pipeline within a blast chamber 383 defined by the apparatus.

Each wing mounts a semi-circular front ring 384 and first and second semi-circular back rings 386 and 388. Each of these rings is securely fastened to the wing. A pair of brackets 390 and 392 are mounted on the rings for arcuate motion in a plane perpendicular the center line of the pipeline and each of these brackets mounts two of the nozzles 382.

With reference to FIGS. 51 and 52, each bracket 390 and 392 can be seen to include a central section 394 with a forward extending arm 396 and side portions 398 and 400 extending at an angle from the central section 394. At the forward end of the arm 396 is mounted an idle carriage 402 as best illustrated in FIGS. 49 and 50. The idle carriage has a pair of notched outer rollers 404 which engage the outer rim of the front ring 384. The carriage also has a single notched inner roller 406 which engages the inner rim of the ring 384. Thus, the idle carriage, and therefore the arm 396, is restrained from radial movement along a radial line extending from the center line of the pipeline, but is permitted to move in an arc at a constant radius from the center line guided along the inner and outer rims of the front ring 384.

Figure 47:
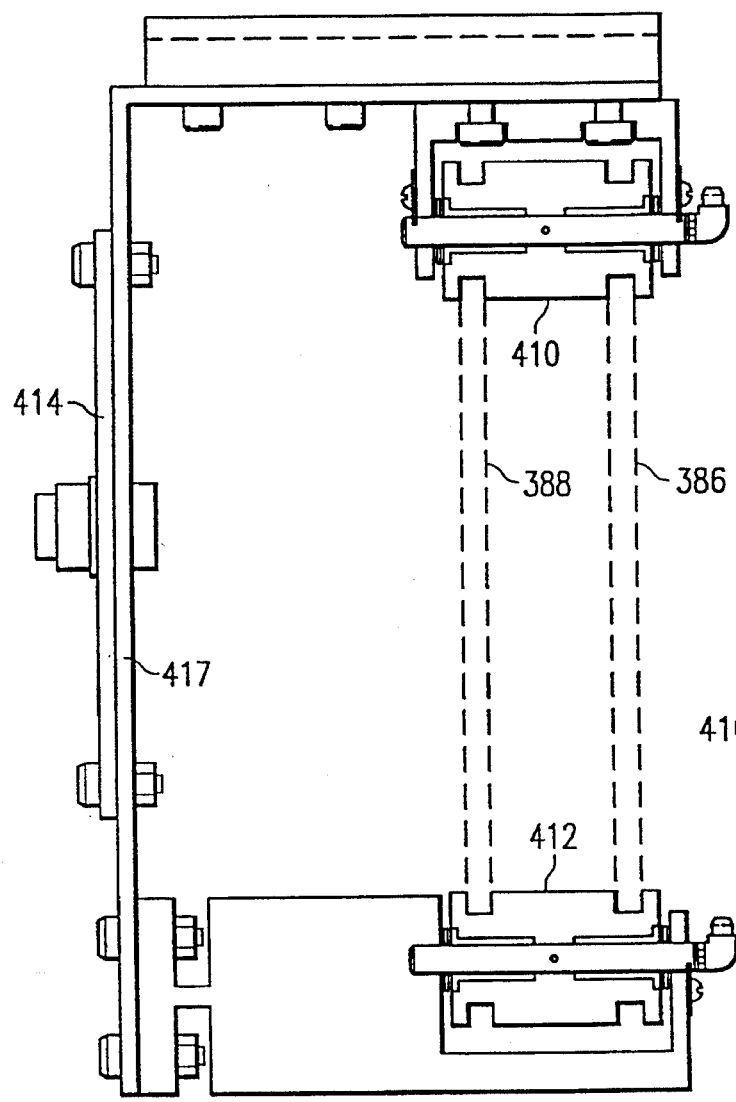
FIG. 47 is a side view of a carriage used in the apparatus.
Figure 48:
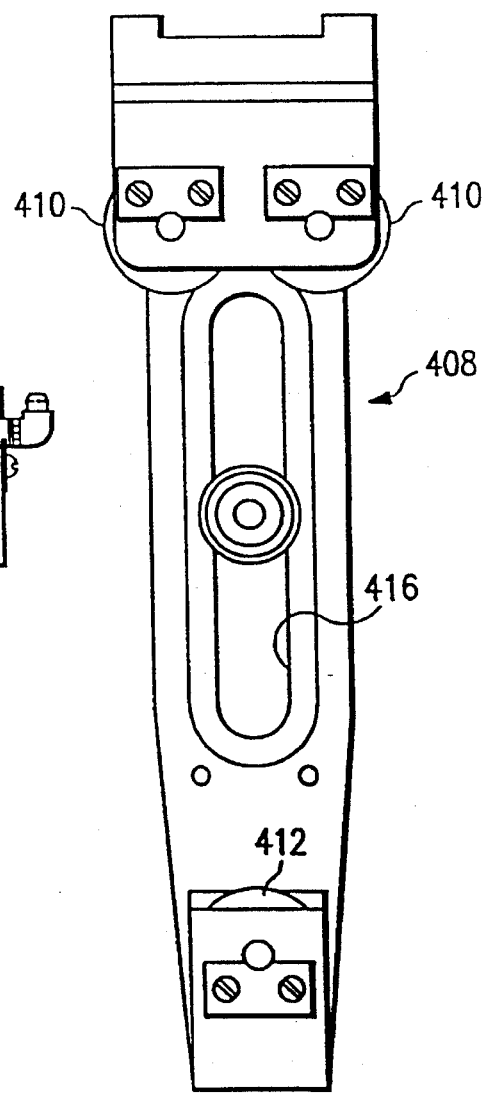
FIG. 48 is a front view of the carriage of FIG. 47.

Mounted to each of the side portions 398 and 400 of the brackets is a drive carriage 408 as illustrated in FIGS. 47 and 48. The drive carriage 408 mounts a pair of double notched outer rollers 410 which engage the outer rims of the rings 386 and 388. A single double notched inner roller 412 engages the inner rim of the rings 386 and 388. Again, the drive carriages 408 and side portions 398 and 400 are prevented from movement in a radial direction along a radial line from the center line of the pipeline by the engagement between the rollers and the rings. However, the carriages and side portions can move in an arcuate direction at a constant radius from the center line of the pipeline guided by the inner and outer rims of the rings 386, 388. Also forming part of each drive carriage 408 is a member 414 which defines an elongated guide slot 416 to engage the chain drive described hereinafter.

A quarter section backing plate 417 is bolted between each pair of drive carriages 408. The backing plate provides support to the carriages 408 and brackets as they oscillate.

Figure 45:
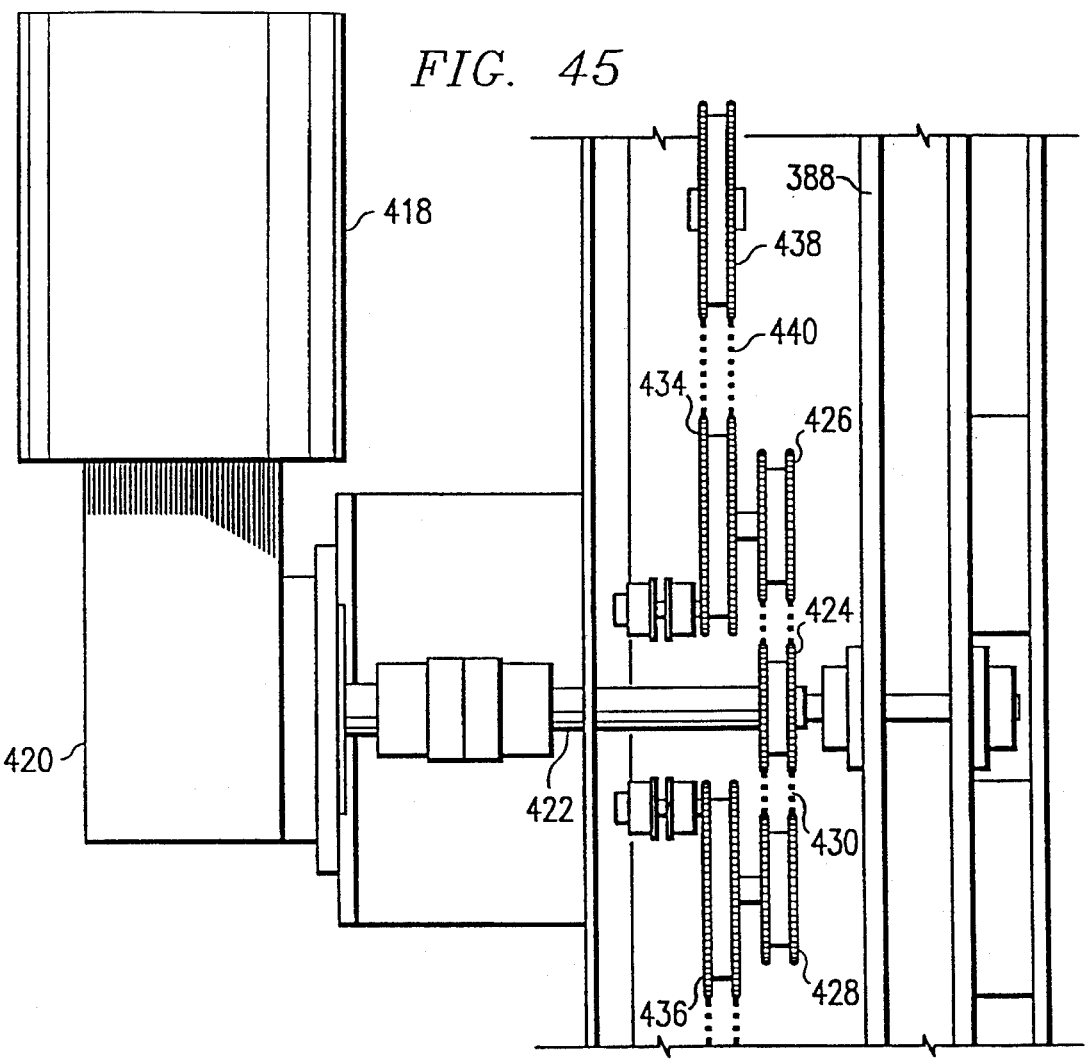
FIG. 45 is an illustrative view of the drive train of the apparatus.
Figure 46:
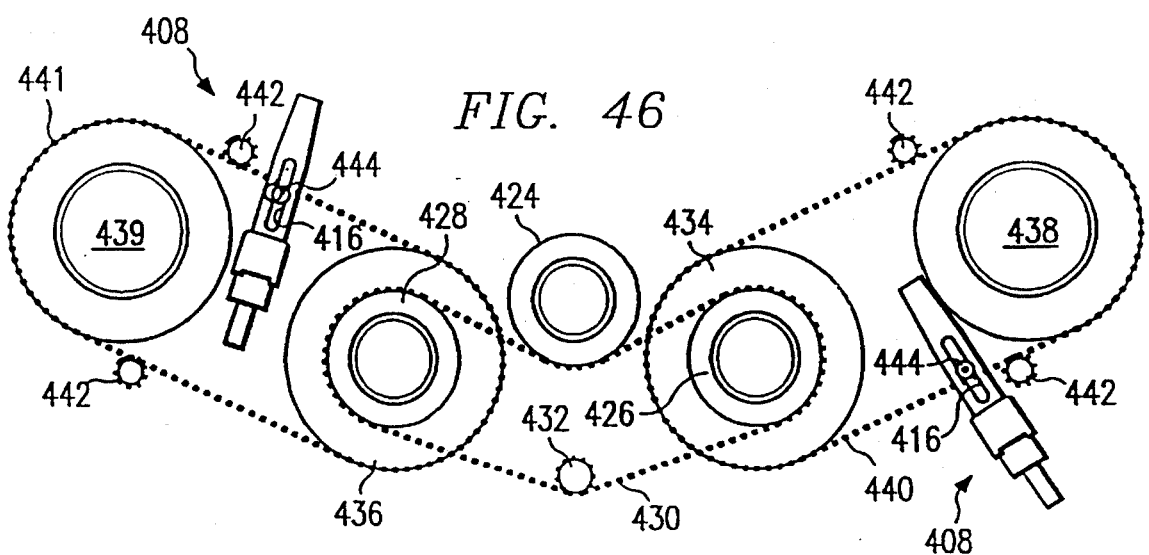
FIG. 46 is an illustrative view of the chain drive of the apparatus.
Figure 55:
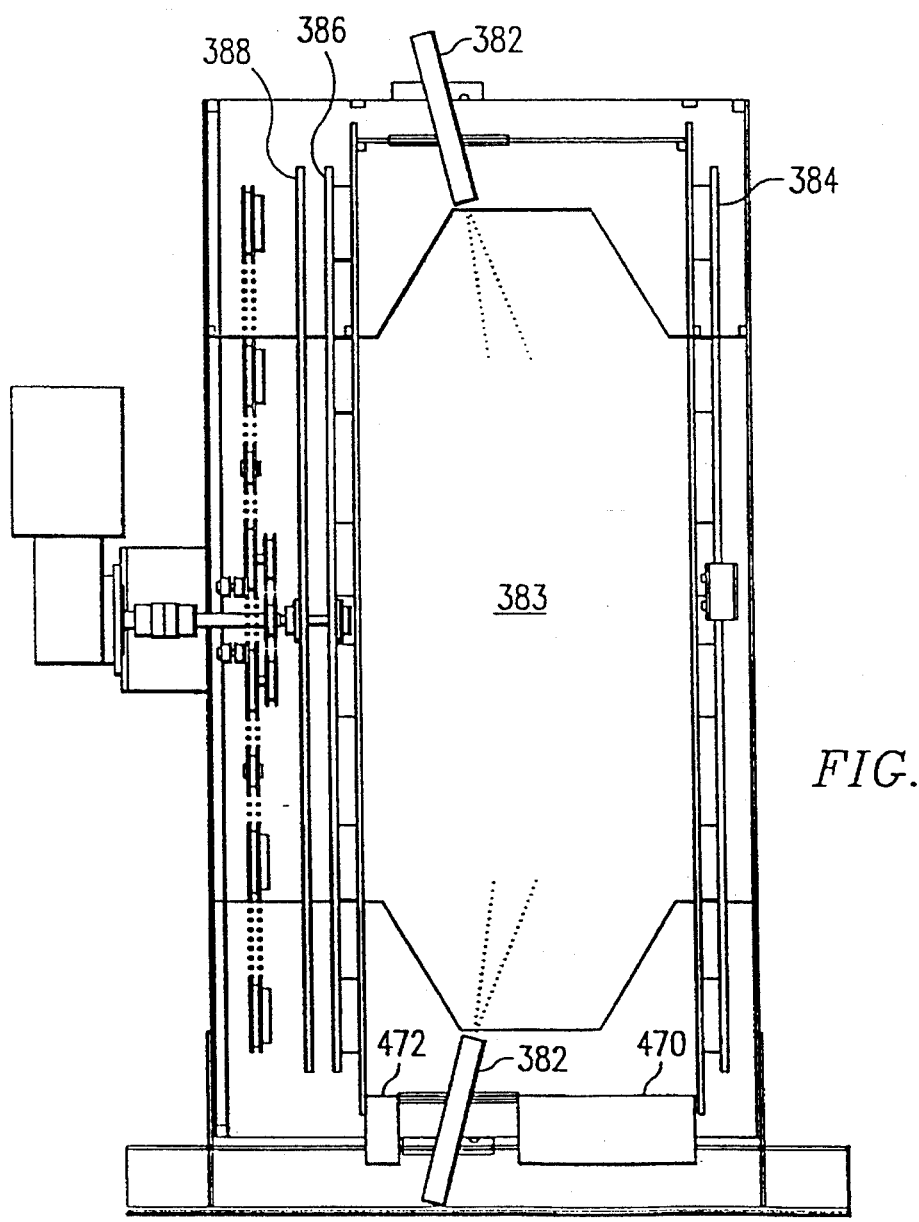
FIG. 55 is a cross-sectional view of the apparatus.
Figure 56A:
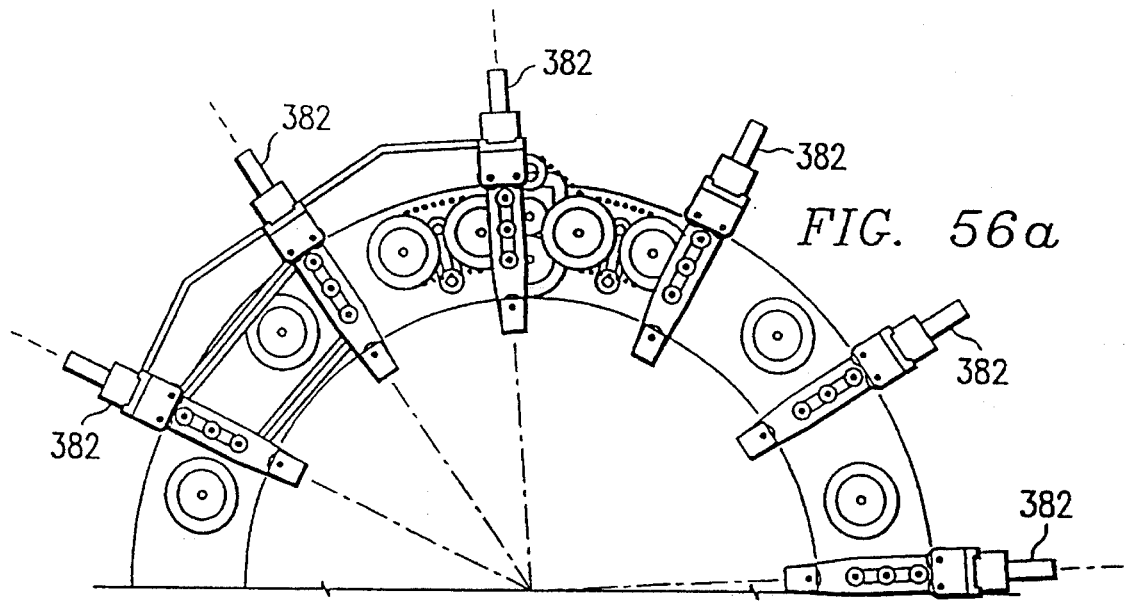
FIGS. 56A, B and C illustrate various nozzle configurations on the apparatus.
Figure 56B:
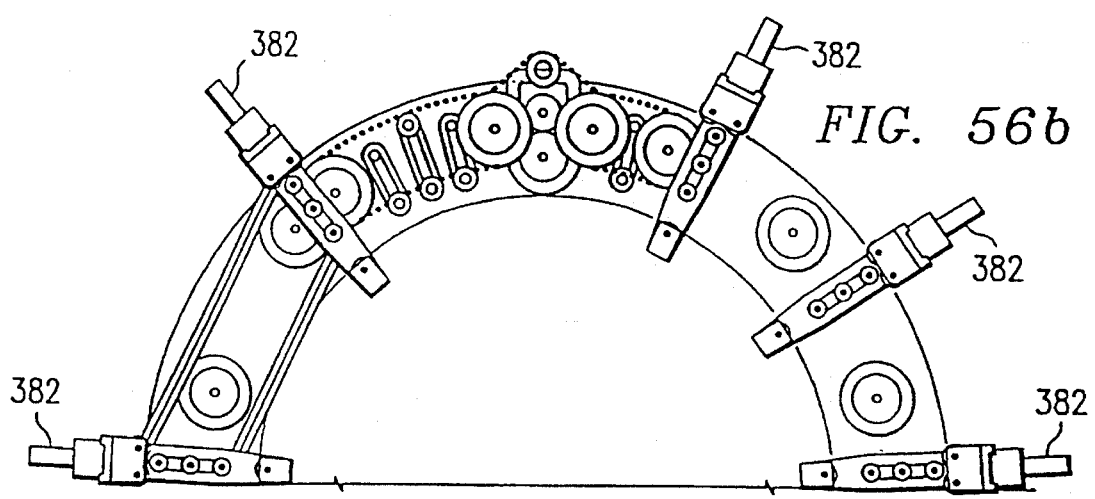
Figure 56C:
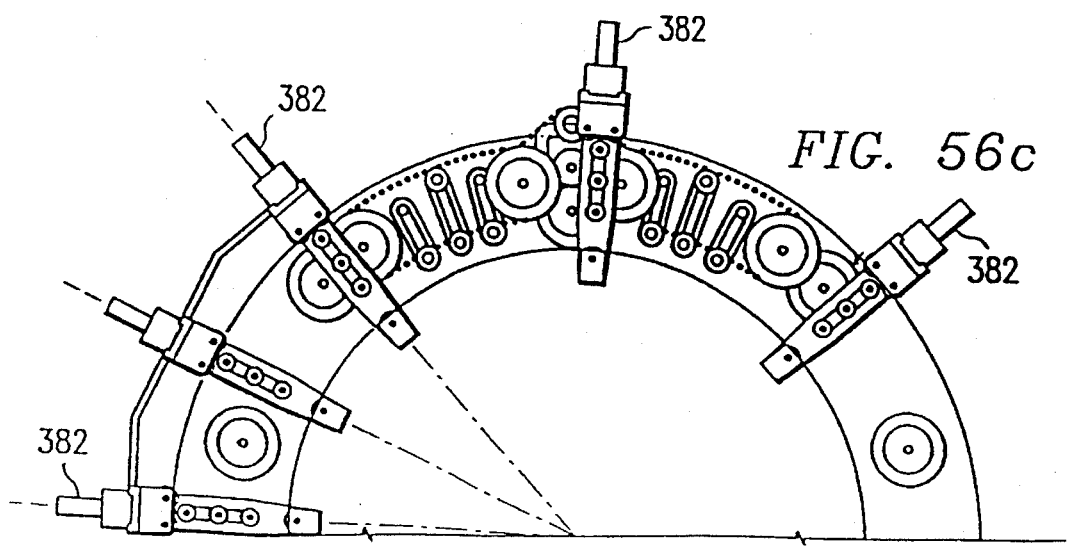

Each wing mounts a drive motor 418 on the back side thereof (see FIGS. 44, 45 and 55). The drive motor is connected to a gear reduction unit 420 and the output of the unit 420 is provided through a drive shaft 422 ending in a gear 424. With reference now to FIGS. 44 and 45, the gear 424 drives gears 426 and 428 through a drive chain 430 tensioned by a tension idler 432. The gears 426 and 428, and tension idler 432, are each mounted for rotation on the back ring 388.

A gear 434 is mounted to gear 426 for joint rotation. Similarly, a gear 436 is attached for rotation with the gear 428. A gear 438 is spaced along the ring from gear 434 and is secured to the ring. A chain 440 extends about the gears 434 and 438 and is tensioned by chain tensioners 442. One link of the chain 440 is provided with a pin 444 which extends rearward from the chain and into the elongated guide slot 416 in one of the two drive carriages 408 mounted on the bracket 390. As the motor drives the gears and chain 440 in a constant unidirectional motion, the pin 444 will cause the drive carriage 408 and nozzles mounted thereon to be oscillated in an arcuate manner determined by the length of the chain 440. The position of gear 438 can be adjusted on the ring 388, and the chain 440 lengthened or shortened accordingly to change the degree of oscillation of the drive carriage, and therefore the nozzles. Similarly, a gear 439 is spaced along the ring from gear 436 and a chain 441 is tensioned about gears 436 and 439 by tensioners 442. One of the links of the chain also has a pin 444 extending rearward to engage the guide slot 416 in one of the drive carriages 408 on bracket 392.

The arcuate motion of each of the brackets 390 and 392 can be tailored for the number of nozzles mounted on the bracket. For example, if two nozzles are mounted on the bracket, one each on a side portion 398 or 400 as seen in FIG. 39, the arcuate motion of the bracket will be desired to about 45°. This will insure that the entire quadrant of the pipeline surface covered by the bracket will be treated. If three nozzles are mounted on the bracket, the chain 440 driving the bracket will be shortened and the gear 438 will be repositioned so that the arcuate motion is about 30°.

It should be noted that each driving motor, driving two brackets 390 and 392, can drive those brackets with different arcuate motions simultaneously. For example, pipe is often rustier on its bottom surface than its top surface. It may therefore be important to provide a heavier cleaning effort on the lower portion of the pipeline than the upper portion in order to maximize the speed of movement of the cleaning apparatus. As such, three nozzles could be put on the brackets 392 on the lower quadrants of the pipeline surface and two nozzles on the brackets 390 on the upper quadrants of the pipeline surface with the respective chains 440 and 441 and gears 438 and 439 positioned so that the upper quadrant is reciprocated 45° and the lower quadrant is reciprocated 30° for the same motion of the drive motor and drive gear 424. Thus, the present design provides great flexibility in tailoring the nozzle distribution for a particular pipeline application. For example, 4 to 12 nozzles, or more, could be used on the apparatus.

Figure 53:
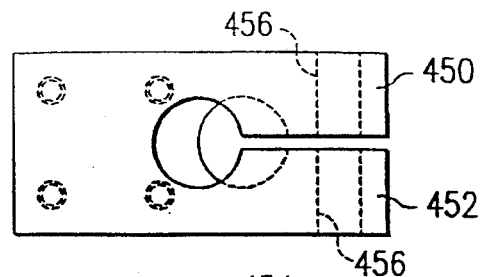
FIG. 53 is a top view of a clamp used in the apparatus.
Figure 54:
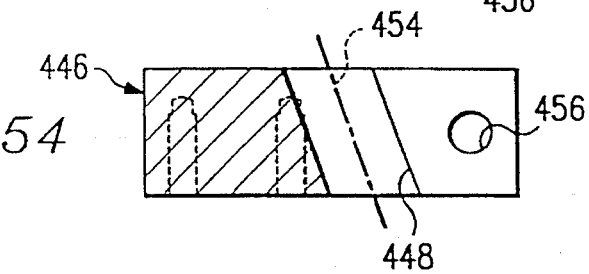
FIG. 54 is a side view of the clamp of FIG. 53.

With reference now to FIGS. 53 and 54, the individual nozzles 382 are held in position on the brackets by a nozzle clamp bracket 446. The bracket has an aperture 448 defined between two clamp arms 450 and 452 to receive the nozzle. The center line 454 of the aperture is preferred to be at an angle from perpendicular to the outer surface of the pipeline, typically 15° which is believed to enhance the action of the nozzle discharge on the outer surface of the pipeline. The nozzle position relative to the outer surface of the pipeline can be varied by moving the nozzle along the center line of the aperture. When the desired position is reached, a bolt is passed through mating holes 456 in each of the arms and the arms are clamped together to clamp the nozzle to the bracket 446.

As seen in FIGS. 39–43, the pipeline treating apparatus 350 can be quickly adjusted for use on a different size pipeline within a predetermined range of sizes, for example, between 20–36 inches pipeline diameter. This is accomplished through the mounts of the drive assembly 362, roller 364 and the idler wheels 378 and 380. As can best be seen in FIG. 39, each idler wheel is mounted on a bracket 460 which has a plurality of holes 462 spaced at one inch intervals therealong which lie on a radial line from the center line of the pipeline. The idler wheels can simply be reattached at different holes 462 along the bracket 460 to adjust the radial position of the idler wheel. The drive assembly 362 and roller 364 are similarly mounted on brackets 464 with a plurality of holes 466 lying on a radial line from the center line of the pipeline to permit the drive assembly to be radially moved in a similar manner.

In addition to the movement of the drive assembly and idler wheels, the annular brushes 468 at each end of the apparatus will be changed to accommodate the diameter of the pipeline. The brushes 468 are intended to isolate the blast chamber 383 defined by the apparatus about the outside of the pipeline being treated from the exterior environment.

In one application, pipeline treating apparatus 350 is designed for cleaning the exterior of a pipeline with small steel particles exhausted from the nozzles by air at a pressure between 100 and 150 psi. The particles, and debris removed from the exterior of the pipeline, will fall by gravity near the bottom of the apparatus 350. Manifolds 470 and 472 are provided at the bottom of the apparatus and are connected to vacuum piping to draw the debris and material out of the apparatus for separation, treatment and disposal.

Although several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the spirit and scope of the invention.

We claim:

1. A pipeline treating apparatus adapted for treating the circumference of a portion of a pipeline, comprising:

a main frame having a drive assembly for moving the main frame along the pipeline;

a first wing pivotally mounted on said main frame for pivotal motion between a first position covering a portion of the outer surface of the pipeline and a second position spaced from the outer surface of the pipeline;

a second wing pivotally mounted to the main frame for pivotal motion between a first position covering a portion of the outer surface of the pipeline and a second position spaced from the outer surface of the pipeline, said first and second wings defining an annular blast chamber therebetween about a length of the outer surface of the pipeline when the wings are in the respective first positions;

each of said wings having a front ring and a back ring, at least one bracket mounted between said rings for arcuate motion in a plane perpendicular to the center line of the pipeline and at least one nozzle mounted on each of said at least one bracket; and a drive mechanism mounted on each of said wings for oscillating, respectively, said at least one bracket of each of said wings and said at least one respective nozzle on each of said at least one bracket a predetermined arcuate distance about the circumference of the pipeline.

2. The apparatus of claim 1 further comprising, for each of said at least one bracket of each of said wings, a nozzle clamp bracket mounted on the bracket defining an aperture to receive at least one nozzle between a first clamp arm and a second clamp arm and a force application device for deflecting the clamp arms to clamp the at least one nozzle within the aperture, a center line of the aperture being oriented to direct the discharge of the at least one nozzle at a desired angle relative to the outer surface of the pipeline, the at least one nozzle being adjustable along the center line by positioning as desired and clamping in place therein.

3. The apparatus of claim 1 further comprising a drive assembly having a drive roller engaging the outer surface of the pipeline and at least one idler wheel for engaging the outer surface of the pipeline, the drive assembly and the at least one idler wheel each being mounted on a bracket with structure for mounting the drive assembly and the at least one idler wheel at various locations along a radial line extending from the center line of the pipeline to permit the apparatus to be used with a range of pipeline diameters.

4. The apparatus of claim 1 wherein, for each of said wings, the drive mechanism further comprises a motor rotating a drive gear, a chain drive having a first gear, a second gear, and a chain engaging said first and second gears, the drive gear rotating said first gear, the chain having a link with a pin extending therefrom, the pin engaged with said at least one bracket, rotation of the drive gear inducing rotation in said first and second gears and movement of the chain in a continuous direction, the pin causing the at least one bracket to oscillate.

5. The apparatus of claim 4 further comprising, for each of said wings, a further bracket mounted on the wing, the further bracket being oscillated by the drive mechanism.

6. The apparatus of claim 5 wherein, for each of said wings, the arcuate motion of each of the brackets is different.

7. The apparatus of claim 1 wherein there is a pair of brackets mounted between the rings of the first wing which mounts two nozzles and a pair of brackets mounted between the rings of the second wing which mounts three nozzles.

8. A pipeline treating apparatus adapted for treating a pipeline, comprising:

a main frame having a drive assembly for moving the main frame along the pipeline;

a first wing pivotally mounted on said main frame for pivotal motion between a first position covering a portion of the outer surface of the pipeline and second position spaced from the outer surface of the pipeline;

a second wing pivotally mounted to the main frame for pivotal motion between a first position covering a portion of the outer surface of the; pipeline and a second position spaced from the outer surface of the pipeline, the first and second wings defining an annular blast chamber about a length of the outer surface of the pipeline when the wings are in the respective first positions;

each said wing having a front ring and a rear ring and at least one bracket, having a front end and a rear end, for each said wing there being a drive carriage being mounted at the front end of the respective at least one bracket and attached to the front ring for arcuate motion and an idler carriage mounted at the rear end of the respective at least one bracket attached to the rear ring for arcuate motion and at least one nozzle mounted on each of said at least one bracket; and a drive mechanism mounted on each of said wings for engaging the respective drive carriage to oscillate the respective at least one bracket and respective at least one nozzle on each wing a predetermined arcuate distance about the circumference of the pipeline.

9. The pipeline treating apparatus of claim 8 wherein the drive mechanism, for each of said wings, includes a motor rotating a drive gear, a chain drive having a first gear, a second gear, and a chain engaging said first and second gears, the drive gear rotating said first gear, the chain having a link with a pin extending therefrom, the pin engaged with said drive carriage, rotation of the drive gear inducing rotation in said first and second gears and movement of the chain in a continuous direction, the pin causing the respective at least one bracket to oscillate.

10. The apparatus of claim 8 wherein, for each of said wings, the drive mechanism is mounted forward of the front ring.

11. The pipeline treating apparatus of claim 8 wherein, for each of said wings, said drive carriage and said idler carriage each have at least one outer wheel engaging an outer rim of the front and rear rings, respectively, and at least one inner wheel engaging an inner rim of said front ring and said rear ring, respectively.

* * * * *